US012598243B2

(12) United States Patent
Rodrigo et al.

(10) Patent No.: US 12,598,243 B2
(45) Date of Patent: Apr. 7, 2026

(54) SERVICE REQUEST AND RESPONSE HANDLING

(71) Applicant: Telefonaktiebolaget LM Ericsson (publ), Stockholm (SE)

(72) Inventors: Maria Cruz Bartolome Rodrigo, Madrid (ES); David Castellanos Zamora, Madrid (ES); Jose Miguel Dopico Sanjuan, Torrelodones (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 18/263,160

(22) PCT Filed: Dec. 10, 2021

(86) PCT No.: PCT/EP2021/085330
§ 371 (c)(1),
(2) Date: Jul. 27, 2023

(87) PCT Pub. No.: WO2022/161685
PCT Pub. Date: Aug. 4, 2022

(65) Prior Publication Data
US 2024/0305699 A1 Sep. 12, 2024

(30) Foreign Application Priority Data
Feb. 1, 2021 (EP) ..................................... 21382082

(51) Int. Cl.
*H04L 67/63* (2022.01)
(52) U.S. Cl.
CPC .................................... *H04L 67/63* (2022.05)
(58) Field of Classification Search
CPC ................................ H04L 67/63; H04L 67/51
See application file for complete search history.

(56) References Cited

U.S. PATENT DOCUMENTS 8,923,184 B2 * 12/2014 Lee ...................... H04L 65/1073
370/312
11,290,549 B2 * 3/2022 Krishan .................. H04L 67/56
(Continued)

FOREIGN PATENT DOCUMENTS

WO WO-2019222604 A1 * 11/2019 ............ H04W 12/06
WO WO-2020254918 A1 * 12/2020 ............ H04W 12/08

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, 441 pages.

(Continued)

*Primary Examiner* — Philip C Lee
(74) *Attorney, Agent, or Firm* — Murphy, Bilak & Homiller, PLLC

(57) ABSTRACT

There is provided a method for handling a first response to a first service request. The method is performed by a first service communication proxy (SCR) node that is configured to operate as an SCR between a first network function (NF) node of a service consumer and one or more groups of second NF nodes of one or more service producers. In response to receiving the first response to the first service request, transmission of a second response to the first service request is initiated (102) towards the first NF node. The first service request is a request for a first service, requested by the first NF node, to be provided. The first response is received from a second NF node that is selected to provide the first service and the second response comprises information indicative of which group of the one or more groups comprises the second NF node.

12 Claims, 9 Drawing Sheets

(56)                    References Cited

U.S. PATENT DOCUMENTS

| 2020/0045753 | A1* | 2/2020 | Dao | H04W 4/08 |
| 2020/0329008 | A1* | 10/2020 | Dao | H04L 61/5007 |
| 2022/0240085 | A1* | 7/2022 | Long | H04W 40/246 |

OTHER PUBLICATIONS

3GPP, "3GPP TS 23.502 V16.7.1", 3rd Generation Partnership Project; Technical Specification Group Services and System Aspects; Procedures for the 5G System (5GS); Stage 2 (Release 16), Jan. 2021, 1-603.

3GPP "3rd Generation Partnership Project; Technical Specification Group Services and System Aspects; Procedures for the 5G System; Stage 2 (Release 16)", 3GPP TS 23.502 V16.1.1, Jun. 2019, 1-495.

3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, 1-450.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, 1-430.

Ericsson, et al., "IMS Optimization for HSS Group ID in an SBA environment", SA WG2 Meeting #137E, S2-2001838, (revision of S2-200XXXXXX), Electronic Meeting, Feb. 24-27, 2020, 1-3.

\* cited by examiner

Figures 4, 5:
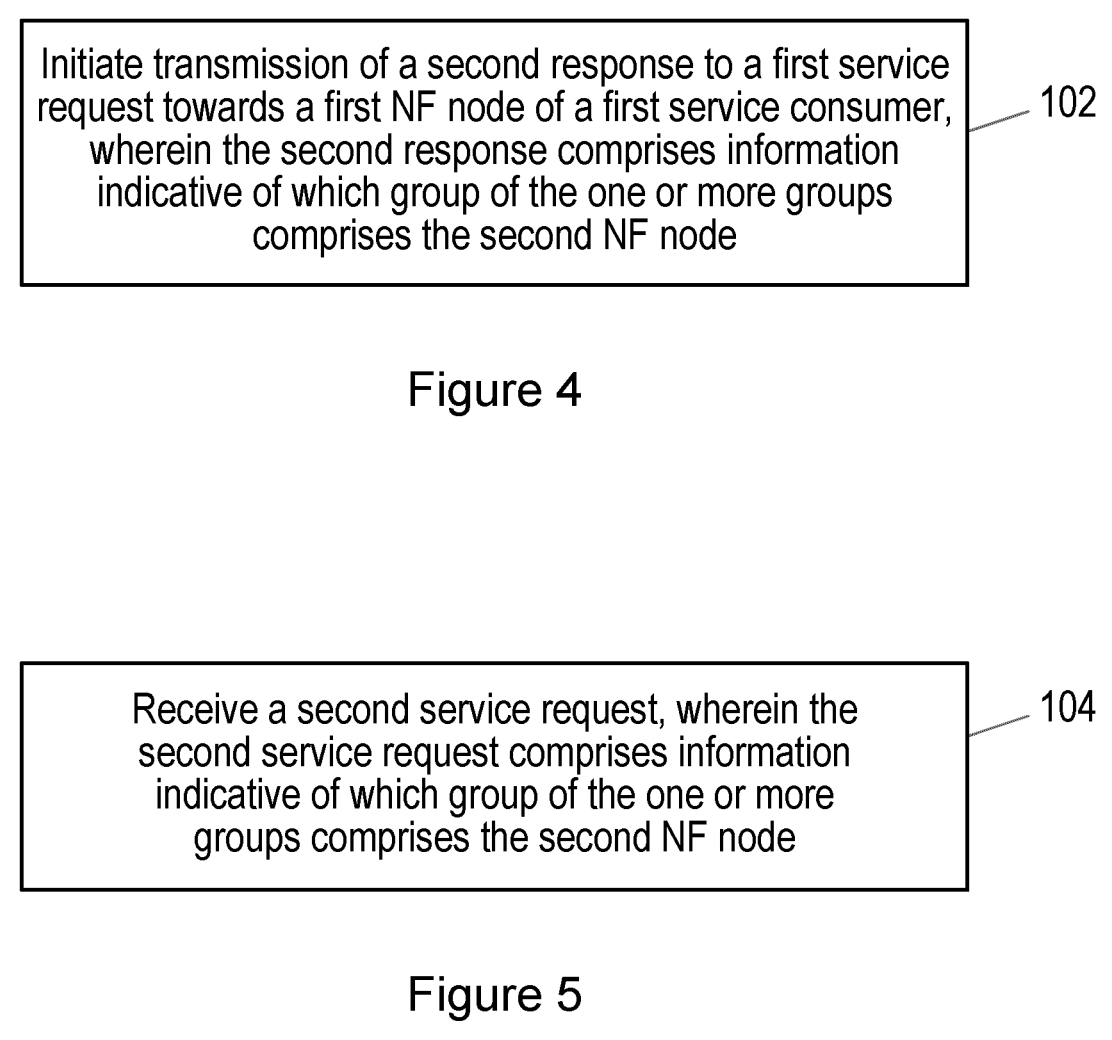

Initiate transmission of a second response to a first service request towards a first NF node of a first service consumer, wherein the second response comprises information indicative of which group of the one or more groups comprises the second NF node

Receive a second service request, wherein the second service request comprises information indicative of which group of the one or more groups comprises the second NF node

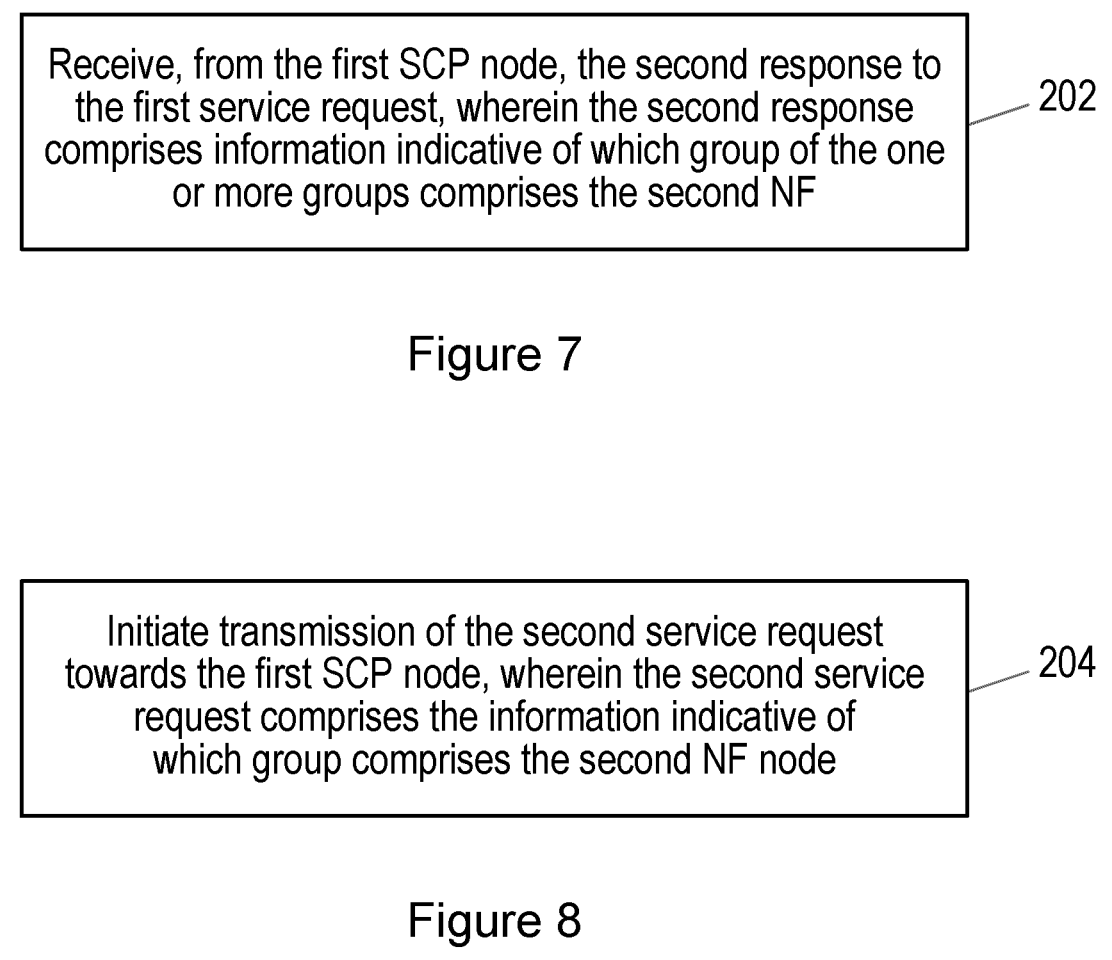

Receive, from the first SCP node, the second response to the first service request, wherein the second response comprises information indicative of which group of the one or more groups comprises the second NF     ⟋ 202

Figure 7

Initiate transmission of the second service request towards the first SCP node, wherein the second service request comprises the information indicative of which group comprises the second NF node     ⟋ 204

Figure 8

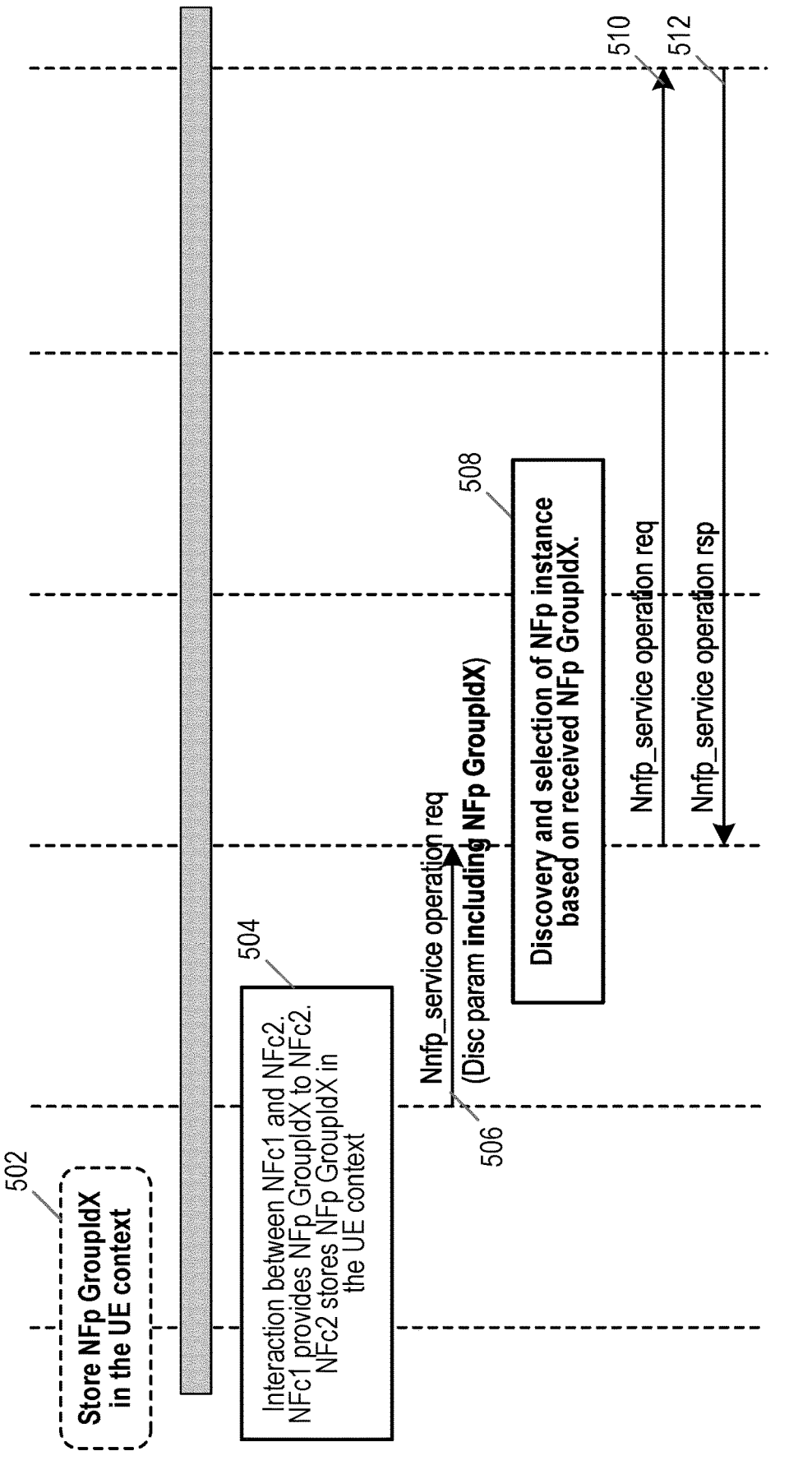
Figure 9 *(continued)*

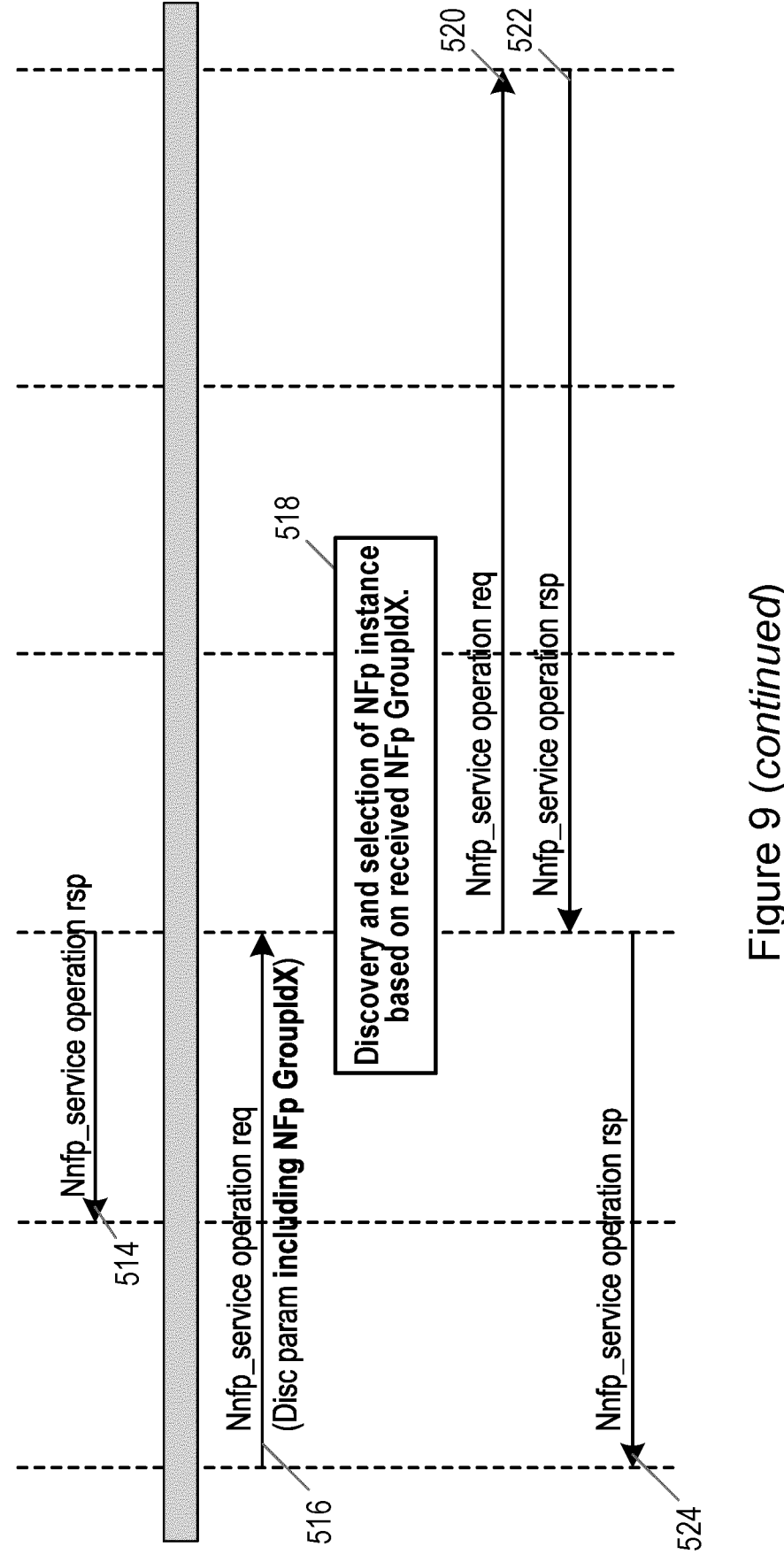
Figure 9 (*continued*)

SERVICE REQUEST AND RESPONSE HANDLING

TECHNICAL FIELD

The disclosure relates to methods for handling service requests and responses in a network, and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrate systems that use direct communication, while FIGS. 1C and 1D illustrate systems that use indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF) node. Thus, in the system illustrated in FIG. 1B, the NF node of the consumer can query the NRF node to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF node is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF node.

In the system illustrated in FIG. 1C, the NF node of the consumer can query the NRF node to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF node to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF node.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

Also, from Release 15, it is possible to partition a network by making use of the so called "Group ID", which identifies a group (or range) of users that an NF node of a service producer serves. The Group ID may thus also be referred to as the NF Group ID. In a partitioned network, the public land mobile network (PLMN) defines different groups for certain NF nodes of service producers. An example is illustrated in FIG. 2.

FIG. 2 is a signalling diagram illustrating an exchange of signals in an existing system, such as the system illustrated in FIG. 1C or the system illustrated in FIG. 1D. The system illustrated in FIG. 2 comprises a first SCP node 10 ("SCP 1"), a first NF node 20 of a service consumer ("NFc"), a second NF node 30 of a service producer ("NFp"), an NRF node 60, and a unified data repository node 50. The first SCP node 10 is configured to operate as an SCP between the first NF node 20 and the second NF node 30. The second NF node 30 can be configured to provide a service ("Service A") 40. A group 402 of second NF nodes of the service producer comprises the second NF node 30.

As illustrated by arrow 300 of FIG. 2, the first NF node 20 transmits (or sends) a service request towards (or via) the first SCP node 10. The first SCP node 10 receives this service request 300. The service request 300 is a request for a service 40 requested by the first NF node 20. The service request 300 can comprise some discovery and/or selection parameters. In the example illustrated in FIG. 2, for indirect communication with delegated discovery, the first NF node 20 needs to provide the first SCP node 10 with all the functional parameters that will be required to find the suitable second NF nodes 30 to provide the requested service 40. In this case, the first NF node 20 is not aware of the Group ID for a group 402 of second NF nodes that comprise the second NF node 30 to which the subscriber for which the service 40 is requested belongs. As such, this Group ID is not provided to the first SCP node 10 as a discovery parameter.

As illustrated by arrow 302 of FIG. 2, the first SCP node 10 transmits a discovery request towards the NRF node 60 and thus the NRF node 60 receives this discovery request 302. The discovery request 302 is a request for information indicative of one or more second NF nodes for providing the service 40 requested by the first NF node 20. The discovery request 302 can comprise discovery and/or selection parameters. The first SCP node 10 can discover profiles of possible destination second NF nodes 30 based on the discovery parameters received. In this example, the discovery parameters include a subscriber identity, e.g. a subscription permanent identifier (SUPI) or a generic public subscription identifier (GPSI). This discovery parameter is used in the discovery request 302 to find suitable second NF nodes 30.

The profiles of the second NF nodes include the Group ID, but may not include the specific subscriber identifier range. As such, the NRF node 60 needs to find the Group ID that corresponds to the received subscriber identifier. For this, the NRF node 60 makes use of a unified data repository (UDR) node 50. Thus, as illustrated by arrow 304 of FIG. 2, the NRF node 60 transmits a request towards the UDR node 50 for the corresponding Group ID and thus the UDR node 50 receives this request 304. For this request 304, the NRF node 60 can make use of the UDR service GroupIdmap-_query that provides a Group ID for a subscriber identity. As illustrated by arrow 306 of FIG. 2, the UDR node 50 transmits a response towards the NRF node 60 and thus this response 304 is received by the NRF node 60. This response 304 comprises the Group ID. More specifically, the corresponding GroupIdX is returned to the NRF node 60.

As illustrated by block 308 of FIG. 2, the NRF node 60 finds a profile of one or more second NF nodes 30 for the Group ID. That is, based on the Group ID, the NRF node 60 is able to identify the corresponding profile(s). As illustrated by arrow 310 of FIG. 2, the NRF node 60 transmits a response to the discovery request 302 towards the first SCP node 10 and thus the first SCP node 10 receives the discovery response 310.

The discovery response 310 comprises the corresponding profile(s). Thus, the NRF node 60 provides the corresponding profile(s), for the subscriber identifier, to the first SCP node 10. As illustrated by block 312 of FIG. 2, the first SCP node 10 selects a second NF node 30 (or an instance of a second NF node 30) from the corresponding profile(s). That is, the first SCP node 10 selects one second NF node 30 among the ones provided. A person skilled in the art will be aware of various criteria on the basis of which the selection can be performed.

As illustrated by arrow 314 of FIG. 2, the first SCP node 10 transmits the service request towards (or forwards the service request from the first NF node 20 to) the selected second NF node 30 and thus the second NF node 30 receives this service request 314. As illustrated by arrow 316 of FIG. 2, the second NF node 30 transmits a response to the service request 314 towards the first SCP node 10 and thus the first SCP node 10 receives this response 316. As illustrated by arrow 318 of FIG. 2, the first SCP node 10 transmits the response to the service request 300 towards (or provides the response back to) the first NF node 20 and thus the first NF node 20 receives this response 318.

SUMMARY

In the case of indirect communication between the first NF node and the second NF node, like in the example illustrated in FIG. 2, the response 318 to a service request 300 does not include any reference to the Group ID to which the subscriber that requested the service 40 belongs. As such, the optimisation described earlier is not possible. For example, in a fifth generation (5G) network, if the first NF node 20 is an access and mobility management function (AMF) node, it is unable to include the Group ID for the group of second NF nodes comprising the selected second NF node 30 (e.g. a unified data management (UDM) Group ID) within a subsequent request to a session management function (SMF) node so that the SMF node can make use of the Group ID received from the AMF node to optimise the discovery and selection of target second NF nodes (or instances of second NF nodes, e.g. UDM instances) applicable to the subscriber.

It is an object of the disclosure to obviate or eliminate at least some of the above-described disadvantages associated with existing techniques.

Therefore, according to an aspect of the disclosure, there is provided a method for handling a first response to a first service request in a network. The method is performed by a first service communication proxy (SCP) node that is configured to operate as an SCP between a first network function (NF) node of a service consumer and one or more groups of second NF nodes of one or more service producers. The method is performed in response to receiving the first response to the first service request. The first service request is a request for a first service, requested by the first NF node, to be provided. The method comprises initiating transmission of a second response to the first service request towards the first NF node. The first response is received from a second NF node that is selected to provide the first service and the second response comprises information indicative of which group of the one or more groups comprises the second NF node.

According to another aspect of the disclosure, there is also provided a first SCP node comprising processing circuitry configured to operate in accordance with this method described in respect of the first SCP node. In some embodiments, the first SCP node may comprise at least one memory for storing instructions which, when executed by the processing circuitry, cause the first SCP node to operate in accordance with this method described in respect of the first SCP node.

According to another aspect of the disclosure, there is also provided a method for handling a first response to a first service request in a network. The method is performed by a first NF node of a service consumer. A first SCP node is configured to operate as an SCP between the first NF node and one or more groups of second NF nodes of one or more service producers. The method comprises receiving, from the first SCP node, the first response to the first service request. The first service request is a request for a first service, requested by the first NF node, to be provided. The first response comprises information indicative of which group of the one or more groups comprises a second NF node that is selected to provide the first service.

According to another aspect of the disclosure, there is provided a first NF node comprising processing circuitry configured to operate in accordance with this method described in respect of the first NF node. In some embodiments, the first NF node may comprise at least one memory for storing instructions which, when executed by the processing circuitry, cause the first NF node to operate in accordance with this method described in respect of the first NF node.

According to another aspect of the disclosure, there is also provided a method for handling a first service request in a network. The method is performed by a first NF node of a first service consumer. A first SCP node is configured to operate as an SCP between the first NF node and one or more groups of second NF nodes of one or more service produc-
ers. The method is performed in response to acquiring
information indicative of which group of the one or more
groups comprises a second NF node that is selected to
provide a first service requested by a third NF node of a
second service consumer. The method comprises initiating
transmission of the first service request towards the first SCP
node. The first service request is a request for a second
service, requested by the first NF node, to be provided. The
first service request comprises the information indicative of
which group of the one or more groups comprises the second
NF node. In some embodiments, the first NF node may be
the same NF node as the third NF node. According to some
of these embodiments, the information may be acquired
from a response to a second service request that precedes the
first service request, where the second service request is a
request for the first service, requested by the third NF node,
to be provided. In other embodiments, the first NF node may
be a different NF node to the third NF node. According to
some of these embodiments, the information may be
acquired from the third NF node.

According to another aspect of the disclosure, there is
provided a first NF node comprising processing circuitry
configured to operate in accordance with this method
described in respect of the first NF node. In some embodi-
ments, the first NF node may comprise at least one memory
for storing instructions which, when executed by the pro-
cessing circuitry, cause the first NF node to operate in
accordance with this method described in respect of the first
NF node.

According to another aspect of the disclosure, there is also
provided a method for handling a first service request in a
network. The method is performed by a first SCP node that
is configured to operate as an SCP between a first NF node
of a first service consumer and one or more groups of second
NF nodes of one or more service producers. The method
comprises receiving the first service request from the first
NF node. The first service request is a request for a first
service, requested by the first NF node, to be provided. The
first service request comprises information indicative of
which group of the one or more groups comprises a second
NF node that is selected to provide a second service
requested by a third NF node of a second service consumer.

In some embodiments, the first NF node may be the same
NF node as the third NF node. In other embodiments, the
first NF node may be a different NF node to the third NF
node.

According to another aspect of the disclosure, there is also
provided a first SCP node comprising processing circuitry
configured to operate in accordance with this method
described in respect of the first SCP node. In some embodi-
ments, the first SCP node may comprise at least one memory
for storing instructions which, when executed by the pro-
cessing circuitry, cause the first SCP node to operate in
accordance with this method described in respect of the first
SCP node.

According to another aspect of the disclosure, there is
provided a method performed by a system. The method
comprises the method described in respect of the first SCP
node and the method described in respect of the first NF
node.

According to another aspect of the disclosure, there is
provided a system comprising at least one first SCP node as
described earlier and at least one first NF node as described
earlier.

According to another aspect of the disclosure, there is
provided a computer program comprising instructions which, when executed by processing circuitry, cause the
processing circuitry to perform the method described in
respect of the first SCP node and/or the method described in
respect of the first NF node.

According to another aspect of the disclosure, there is
provided a computer program product, embodied on a
non-transitory machine-readable medium, comprising
instructions which are executable by processing circuitry to
cause the processing circuitry to perform the method
described in respect of the first SCP node and/or the method
described in respect of the first NF node.

Therefore, an improved technique for handling service
requests and responses in a network is provided.

BRIEF DESCRIPTION OF THE DRAWINGS

For a better understanding of the technique, and to show
how it may be put into effect, reference will now be made,
by way of example, to the accompanying drawings, in
which:

FIG. 4 is a flowchart illustrating a method performed by
a first SCP node according to an embodiment;

FIG. 5 is a flowchart illustrating a method performed by
a first SCP node according to an embodiment;

FIG. 7 is a flowchart illustrating a method performed by
an NF consumer node according to an embodiment;

FIG. 8 is a flowchart illustrating a method performed by
an NF consumer node according to an embodiment.

DETAILED DESCRIPTION

Figure 1:
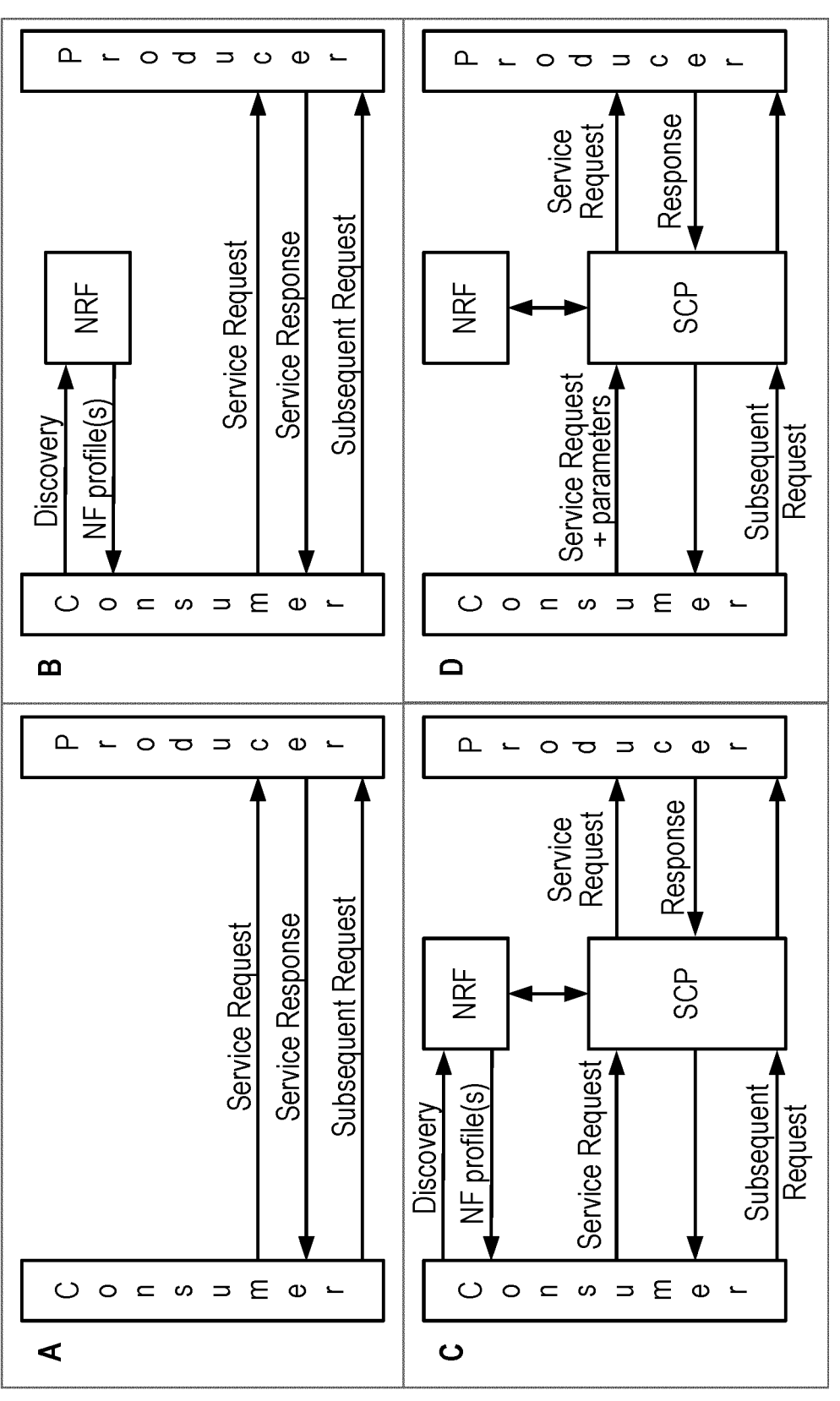
FIG. 1A-D is a block diagram illustrating different exist-
ing systems.
Figure 2:
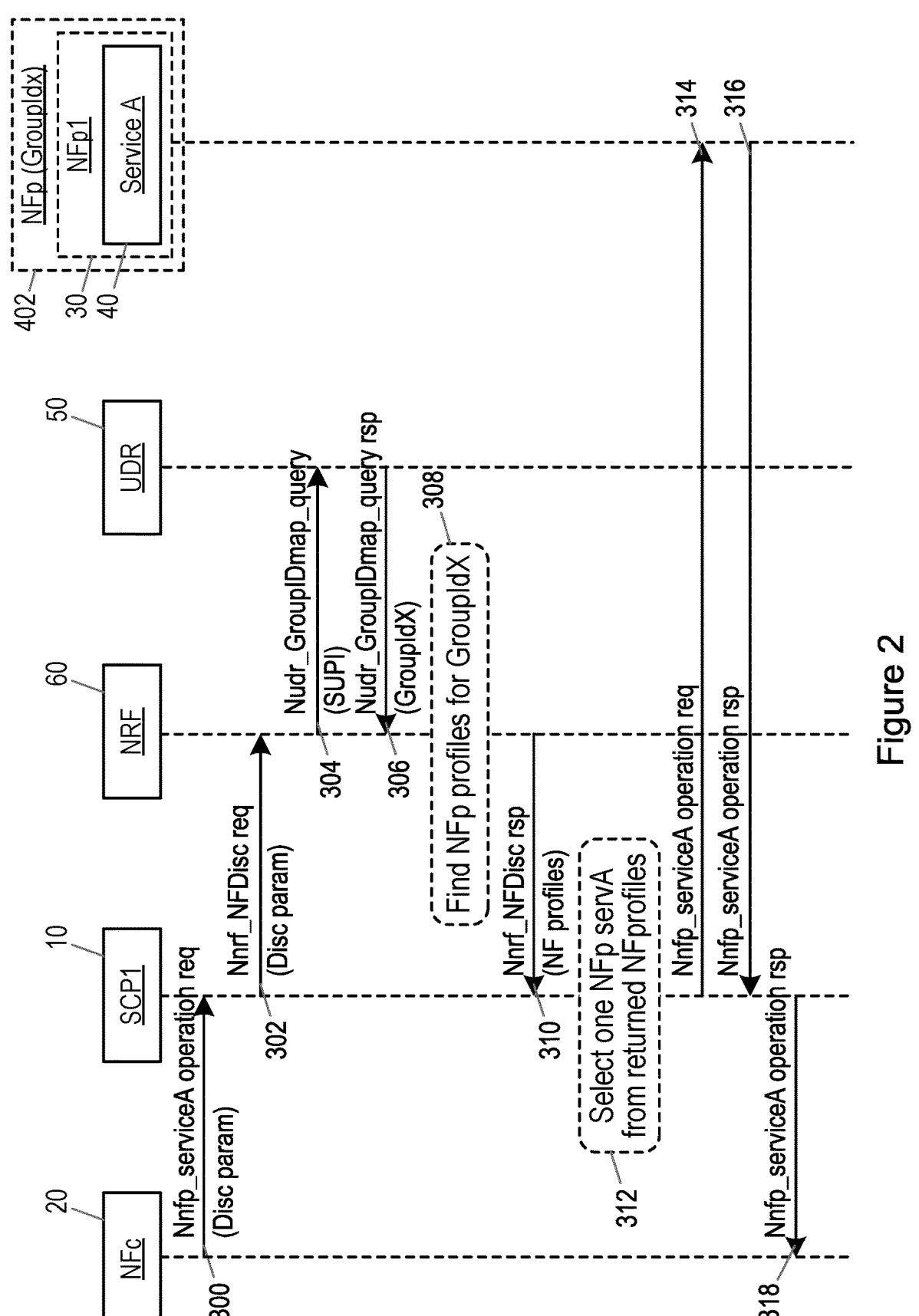
FIG. 2 is a signalling diagram illustrating an exchange of
signals in an existing system.

Herein, techniques for handling service requests and
responses in a network are described. A service request can
also be referred to as a request for a service. Generally, a
service is software intended to be managed for a user.
Herein, a service can be any type of service, such as a
communication service (e.g. a notification service or a
callback service), a context management (e.g. user equip-
ment context management (UECM)) service, a data man-
agement (DM) service, or any other type of service.

The techniques described herein can be used in respect of
any network, such as any communications or telecommu-
nications network, e.g. cellular network. The network may
be a fifth generation (5G) network or any other generation
network. In some embodiments, the network may be a core
network or a radio access network (RAN).

The techniques described herein are implemented by a
first service communication proxy (SCP) node and one or
more network function (NF) nodes of a service consumer,
which may also be referred to as one or more NF consumer
nodes. The first SCP node is a node that is configured to
operate as an SCP between the one or more NF consumer
nodes and one or more groups of second NF nodes of one or
more service producers.

An NF is a third generation partnership project (3GPP)
adopted, or 3GPP defined, processing function in a network,
which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios. Herein, references to a plurality of NF nodes of a service producer may refer to, for example, functionally equivalent instances of NF nodes of the service producer.

Where a network comprises one or more groups of second NF nodes, the network is said to be partitioned. As mentioned earlier, from Release 15, it is possible to partition a network by making use of the so called "Group ID", which identifies a group (or range) of users that an NF node of a service producer serves. The profile of an NF node of a service producer, which is registered in the NRF node, includes the Group ID that it supports. Additionally, the profile can include a list of subscriber identifiers, such as subscription permanent identifiers (SUPIs) and/or generic public subscription identifiers (GPSIs), that are supported by the NF node of the service producer and that are associated to the Group ID for that NF node. Alternatively, the NRF node may use a unified data repository (UDR), which can store the relation of subscription identifiers (SUPI/GPSI or range of SUPI/GPSI) with their corresponding NF Group ID. The corresponding NF node of the service producer is then able to register in the NRF node with only this Group ID, without needing to indicate the subscription identifier ranges (or even worse in the case of scattered subscription identifiers).

An NF node of a service producer that may be partitioned needs to identify, based on the subscriber identity (e.g. SUPI/GPSI), the Group ID that serves this subscriber. Based on this, the NF node of the service producer needs to find corresponding NF nodes of the service producer (i.e. those that belong to, or serve, that specific Group ID). For example, in a fifth generation (5G) network, an access and mobility management function (AMF) node needs to discover the unified data management (UDM) nodes that serve a SUPI. Thus, the AMF node performs an NRF discovery using the SUPI as input parameter and then the NRF returns the NF nodes of the service producer that belong to (or serve) that Group ID. To be able to provide this information, the NRF node needs to identify the Group ID that a SUPI belongs to, e.g. making use of an existing UDR service (Nudr_GroupIDmap service).

The knowledge, at an NF node of a service producer, of a Group ID that a subscriber belongs to facilitates subsequent discovery and selection procedures towards the same NF node of the service producer within a given NF node of a service consumer and also in other NF nodes of a servicer consumer. There is a standard optimisation procedure defined in TS 23.501 and TS 23.502. In this procedure, once one NF node of a service consumer knows the NF node service producer Group ID that a subscriber belongs to, the NF node of the service consumer can forward this Group ID to another NF node of a service consumer that needs to communicate with the NF node of the service producer for the same subscriber.

For example, in a 5G network, the AMF node obtains the Group ID that a SUPI belongs to and then the AMF node can forward a UDM Group ID to a session management function (SMF) node. This avoids the need for the SMF node to again discover the UDM node for the same subscriber based on its SUPI. This optimisation saves the NRF node queries, and the discovery and selection processing, in both the NRF node and multiple NF nodes of service consumers. For this example, in section 6.3.8 of TS 23.501, it is stated that the AMF node can infer the UDM Group ID a user equipment's (UE's) SUPI belongs to, based on the results of UDM discovery procedures with the NRF node and also that the AMF node provides the UDM Group ID the SUPI belongs to other UDM NF consumers as described in TS 23.502. The same optimisation can be applied in the context of evolved internet protocol multimedia subsystem (IMS) between service based index (SBI) capable IMS entities and SBI capable home subscriber servers (HSSs).

Figure 3:
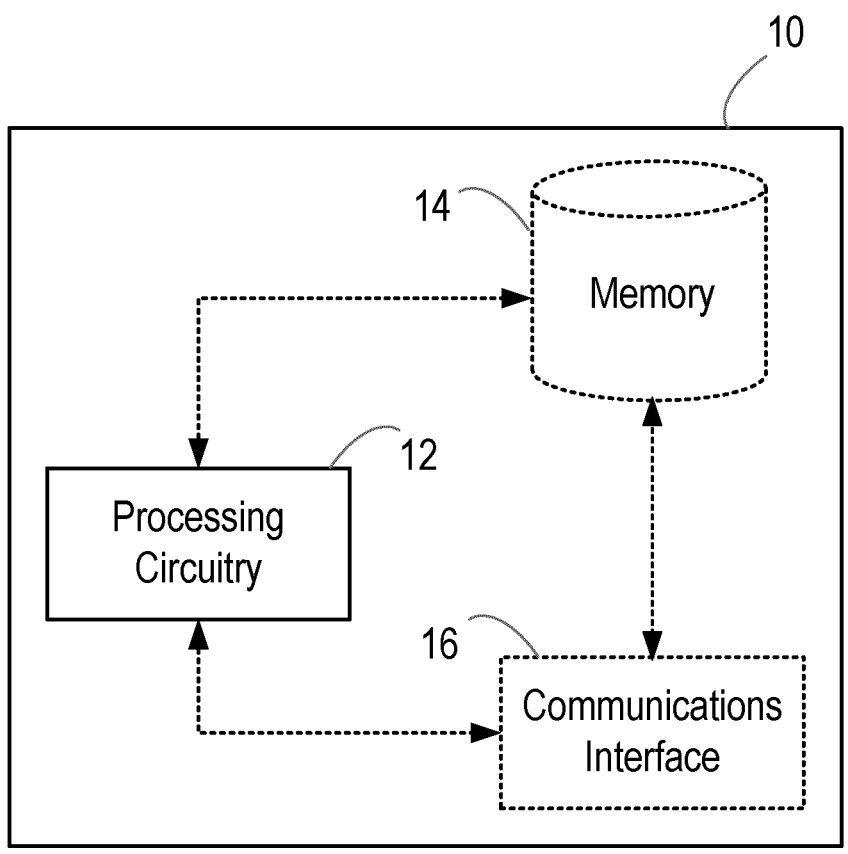
FIG. 3 is a block diagram illustrating a first SCP node
according to an embodiment.

FIG. 3 illustrates a first SCP node 10 in accordance with an embodiment. The first SCP node 10 is for handling responses to service requests in a network. In some embodiments, the first SCP node 10 can, for example, be a physical machine (e.g. a server) or a virtual machine (VM). The first SCP node is configured to operate as an SCP between a first NF node of a first service consumer and one or more groups of second NF nodes of one or more service producers.

As illustrated in FIG. 3, the first SCP node 10 comprises processing circuitry (or logic) 12. The processing circuitry 12 controls the operation of the first SCP node 10 and can implement the method described herein in respect of the first SCP node 10. The processing circuitry 12 can be configured or programmed to control the first SCP node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first SCP node 10. In some embodiments, the processing circuitry 12 can be configured to run software to perform the method described herein in respect of the first SCP node 10. The software may be containerised according to some embodiments. Thus, in some embodiments, the processing circuitry 12 may be configured to run a container to perform the method described herein in respect of the first SCP node 10.

Briefly, the processing circuitry 12 of the first SCP node 10 is configured to, in response to receiving a first response to a first service request, initiate transmission of a second response to the first service request towards the first NF node. The first service request is a request for a first service, requested by the first NF node, to be provided (e.g. executed or run). The first response is received from a second NF node that is selected to provide (e.g. execute or run) the first service. The second response comprises information indicative of which group of the one or more groups comprises the second NF node.

Alternatively or in addition, the processing circuitry 12 of the first SCP node 10 can be configured to receive a second service request from an NF node of a service consumer (i.e. the first NF node of the first service consumer or a third NF node of a second consumer). The second service request is a request for a second service, requested by the NF node of the service consumer (i.e. the first NF node of the first service consumer or a third NF node of a second consumer), to be provided (e.g. executed or run). The second service request comprises the information indicative of which group of the one or more groups comprises the second NF node that is selected to provide (e.g. execute or run) the first service requested by the first NF node.

As illustrated in FIG. 3, in some embodiments, the first SCP node 10 may optionally comprise a memory 14. The memory 14 of the first SCP node 10 can comprise a volatile memory or a non-volatile memory. In some embodiments, the memory 14 of the first SCP node 10 may comprise a non-transitory media. Examples of the memory 14 of the first SCP node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first SCP node 10 can be connected to the memory 14 of the first SCP node 10. In some embodiments, the memory 14 of the first SCP node 10 may be for storing program code or instructions which, when executed by the processing circuitry 12 of the first SCP node 10, cause the first SCP node 10 to operate in the manner described herein in respect of the first SCP node 10. For example, in some embodiments, the memory 14 of the first SCP node 10 may be configured to store program code or instructions that can be executed by the processing circuitry 12 of the first SCP node 10 to cause the first SCP node 10 to operate in accordance with the method described herein in respect of the first SCP node 10. Alternatively or in addition, the memory 14 of the first SCP node 10 can be configured to store any information, data, messages, requests, responses, indications, notifications, signals, or similar, that are described herein. The processing circuitry 12 of the first SCP node 10 may be configured to control the memory 14 of the first SCP node 10 to store information, data, messages, requests, responses, indications, notifications, signals, or similar, that are described herein.

In some embodiments, as illustrated in FIG. 3, the first SCP node 10 may optionally comprise a communications interface 16. The communications interface 16 of the first SCP node 10 can be connected to the processing circuitry 12 of the first SCP node 10 and/or the memory 14 of the first SCP node 10. The communications interface 16 of the first SCP node 10 may be operable to allow the processing circuitry 12 of the first SCP node 10 to communicate with the memory 14 of the first SCP node 10 and/or vice versa. Similarly, the communications interface 16 of the first SCP node 10 may be operable to allow the processing circuitry 12 of the first SCP node 10 to communicate with the first NF node, any second NF nodes, and/or any other node mentioned herein.

The communications interface 16 of the first SCP node 10 can be configured to transmit and/or receive information, data, messages, requests, responses, indications, notifications, signals, or similar, that are described herein. In some embodiments, the processing circuitry 12 of the first SCP node 10 may be configured to control the communications interface 16 of the first SCP node 10 to transmit and/or receive information, data, messages, requests, responses, indications, notifications, signals, or similar, that are described herein.

Although the first SCP node 10 is illustrated in FIG. 3 as comprising a single memory 14, it will be appreciated that the first SCP node 10 may comprise at least one memory (i.e. a single memory or a plurality of memories) 14 that operate in the manner described herein. Similarly, although the first SCP node 10 is illustrated in FIG. 3 as comprising a single communications interface 16, it will be appreciated that the first SCP node 10 may comprise at least one communications interface (i.e. a single communications interface or a plurality of communications interface) 16 that operate in the manner described herein. It will also be appreciated that FIG. 3 only shows the components required to illustrate an embodiment of the first SCP node 10 and, in practical implementations, the first SCP node 10 may comprise additional or alternative components to those shown.

FIG. 4 is a flowchart illustrating a method performed by a first SCP node 10 in accordance with an embodiment. The method is for handling responses to service requests in the network. The first SCP node 10 described earlier with reference to FIG. 3 can be configured to operate in accordance with the method of FIG. 4. The method can be performed by or under the control of the processing circuitry 12 of the first SCP node 10. The method is performed in response to receiving the first response to the first service request. The first service request is the request for the first service, requested by the first NF node, to be provided (e.g. executed or run). The first response is received from the second NF node that is selected to provide (e.g. execute or run) the first service.

As illustrated at block 102 of FIG. 4, transmission of the second response to the first service request is initiated towards the first NF node. The second response comprises the information indicative of which group of the one or more groups comprises the second NF node. Herein, the term "initiate" can mean, for example, cause or establish.

Thus, the processing circuitry 12 of the first SCP node 10 can be configured to itself transmit the second response (e.g. via a communications interface 16 of the first SCP node 10) or can be configured to cause another node to transmit the second response.

FIG. 5 is a flowchart illustrating a method performed by a first SCP node 10 in accordance with an embodiment. The method is for handling service requests in the network. The first SCP node 10 described earlier with reference to FIG. 3 can be configured to operate in accordance with the method of FIG. 5. The method can be performed by or under the control of the processing circuitry 12 of the first SCP node 10.

Figure 6:
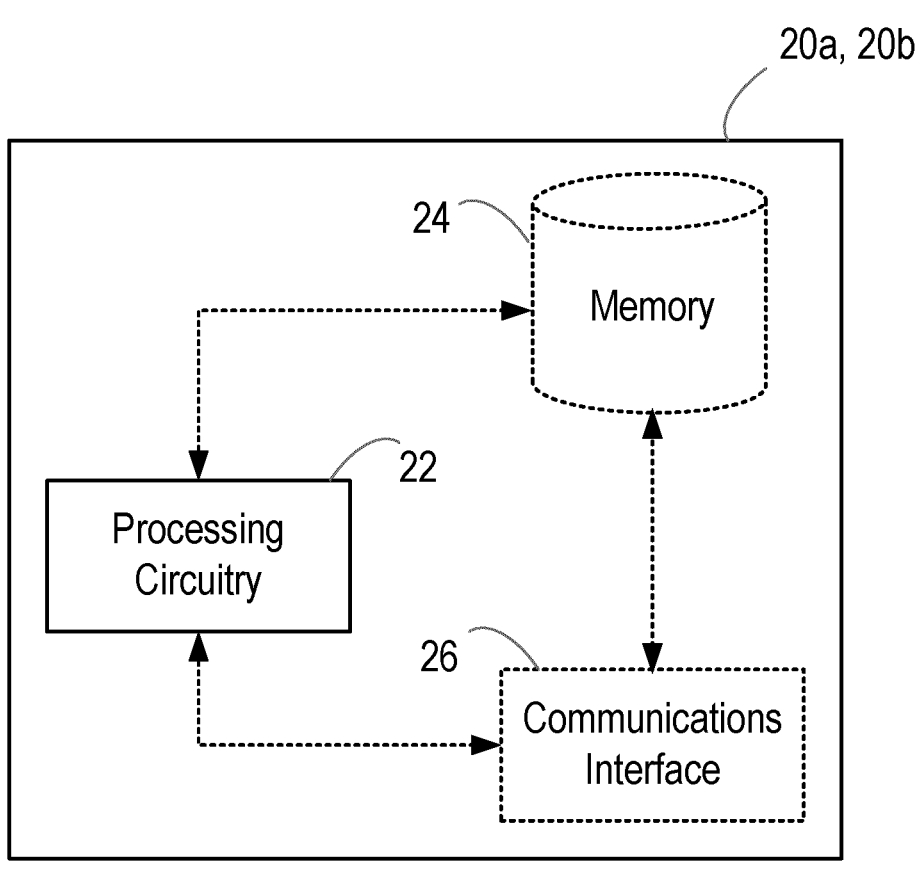
FIG. 6 is a block diagram illustrating an NF consumer
node according to an embodiment.

As illustrated at block 104 of FIG. 5, the second service request is received from the NF consumer node (i.e. the first NF node or the third NF node). The second service request is the request for the second service, requested by the NF consumer node (i.e. the first NF node or the third NF node), to be provided (e.g. executed or run). The second service request comprises the information indicative of which group of the one or more groups comprises the second NF node that is selected to provide (e.g. execute or run) the first service requested by the first NF node of the first service consumer. FIG. 6 illustrates an NF node 20a, 20b of a service consumer in accordance with an embodiment. The NF node 20a, 20b of the service consumer can be a first NF node 20a of a first service consumer or a third NF node 20b of a second service consumer.

The first service consumer and the second service consumer referred to herein can be the same or different. For the purpose of FIG. 6, the NF node 20a, 20b of the service consumer will be referred to as the NF consumer node 20a, 20b and the corresponding description will be understood to apply to the first NF node 20a and/or the third NF node 20b, unless specifically stated otherwise. Herein, the first NF node can be the same NF node as the third NF node or the first NF node can be a different NF node to the third NF node.

The NF consumer node 20a, 20b is for handling responses to service requests in a network. As mentioned earlier, the first SCP node 10 can be configured to operate as an SCP between the NF consumer node 20a, 20b and one or more groups of second NF nodes of one or more service producers. In some embodiments, the NF consumer node 20a, 20b can, for example, be a physical machine (e.g. a server) or a virtual machine (VM). The NF consumer node 20a, 20b can be, for example, a user equipment (UE).

As illustrated in FIG. 6, the NF consumer node 20*a*, 20*b* comprises processing circuitry (or logic) 22. The processing circuitry 22 controls the operation of the NF consumer node 20*a*, 20*b* and can implement the method described herein in respect of the NF consumer node 20*a*, 20*b*. The processing circuitry 22 can be configured or programmed to control the NF consumer node 20*a*, 20*b* in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the NF consumer node 20*a*, 20*b*. In some embodiments, the processing circuitry 22 can be configured to run software to perform the method described herein in respect of the NF consumer node 20*a*, 20*b*. The software may be containerised according to some embodiments. Thus, in some embodiments, the processing circuitry 22 may be configured to run a container to perform the method described herein in respect of the NF consumer node 20*a*, 20*b*.

Briefly, the processing circuitry 22 of the first NF node 20*a* can be configured to receive, from the first SCP node 10, the second response to the first service request.

The first service request is the request for the first service, requested by the first NF node 20*a*, to be provided (e.g. executed or run). The second response comprises the information indicative of which group of the one or more groups comprises the second NF node that is selected to provide (e.g. execute or run) the first service.

Alternatively or in addition, the processing circuitry 22 of the NF consumer node 20*a*, 20*b* (i.e. the first NF node 20*a* and/or the third NF node 20*b*) can be configured to, in response to acquiring the information indicative of which group of the one or more groups comprises the second NF node that is selected to provide (e.g. execute or run) the first service requested by the first NF node 20*a* of the first service consumer, initiate transmission of the second service request towards the first SCP node 10. The second service request is the request for the second service, requested by the NF consumer node 20*a*, 20*b* (i.e. the first NF node 20*a* or the third NF node 20*b*), to be provided (e.g. execute or run). The second service request comprises the information indicative of which group of the one or more groups comprises the second NF node.

As illustrated in FIG. 6, in some embodiments, the NF consumer node 20*a*, 20*b* may optionally comprise a memory 24. The memory 24 of the NF consumer node 20*a*, 20*b* can comprise a volatile memory or a non-volatile memory. In some embodiments, the memory 24 of the NF consumer node 20*a*, 20*b* may comprise a non-transitory media. Examples of the memory 24 of the NF consumer node 20*a*, 20*b* include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the NF consumer node 20*a*, 20*b* can be connected to the memory 24 of the NF consumer node 20*a*, 20*b*. In some embodiments, the memory 24 of the NF consumer node 20*a*, 20*b* may be for storing program code or instructions which, when executed by the processing circuitry 22 of the NF consumer node 20*a*, 20*b*, cause the NF consumer node 20*a*, 20*b* to operate in the manner described herein in respect of the NF consumer node 20*a*, 20*b*. For example, in some embodiments, the memory 24 of the NF consumer node 20*a*, 20*b* may be configured to store program code or instructions that can be executed by the processing circuitry 22 of the NF consumer node 20*a*, 20*b* to cause the NF consumer node 20*a*, 20*b* to operate in accordance with the method described herein in respect of the NF consumer node 20*a*, 20*b*. Alternatively or in addition, the memory 24 of the NF consumer node 20*a*, 20*b* can be configured to store any information, data, messages, requests, responses, indications, notifications, signals, or similar, that are described herein. The processing circuitry 22 of the NF consumer node 20*a*, 20*b* may be configured to control the memory 24 of the NF consumer node 20*a*, 20*b* to store information, data, messages, requests, responses, indications, notifications, signals, or similar, that are described herein.

In some embodiments, as illustrated in FIG. 6, the NF consumer node 20*a*, 20*b* may optionally comprise a communications interface 26. The communications interface 26 of the NF consumer node 20*a*, 20*b* can be connected to the processing circuitry 22 of the NF consumer node 20*a*, 20*b* and/or the memory 24 of NF consumer node 20*a*, 20*b*. The communications interface 26 of the NF consumer node 20*a*, 20*b* may be operable to allow the processing circuitry 22 of the NF consumer node 20*a*, 20*b* to communicate with the memory 24 of the NF consumer node 20*a*, 20*b* and/or vice versa. Similarly, the communications interface 26 of the NF consumer node 20*a*, 20*b* may be operable to allow the processing circuitry 22 of the NF consumer node 20*a*, 20*b* to communicate with the first SCP node 10 and/or any other node mentioned herein. The communications interface 26 of the NF consumer node 20*a*, 20*b* can be configured to transmit and/or receive information, data, messages, requests, responses, indications, notifications, signals, or similar, that are described herein. In some embodiments, the processing circuitry 22 of the NF consumer node 20*a*, 20*b* may be configured to control the communications interface 26 of the NF consumer node 20*a*, 20*b* to transmit and/or receive information, data, messages, requests, responses, indications, notifications, signals, or similar, that are described herein.

Although the NF consumer node 20*a*, 20*b* is illustrated in FIG. 6 as comprising a single memory 24, it will be appreciated that the NF consumer node 20*a*, 20*b* may comprise at least one memory (i.e. a single memory or a plurality of memories) 24 that operate in the manner described herein. Similarly, although the NF consumer node 20*a*, 20*b* is illustrated in FIG. 6 as comprising a single communications interface 26, it will be appreciated that the NF consumer node 20*a*, 20*b* may comprise at least one communications interface (i.e. a single communications interface or a plurality of communications interface) 26 that operate in the manner described herein. It will also be appreciated that FIG. 6 only shows the components required to illustrate an embodiment of the NF consumer node 20*a*, 20*b* and, in practical implementations, the NF consumer node 20*a*, 20*b* may comprise additional or alternative components to those shown.

FIG. 7 is a flowchart illustrating a method performed by the first NF node 20*a* in accordance with an embodiment. The method is for handling the second response to the first service request in the network. The NF consumer node 20*a* described earlier with reference to FIG. 6 can be configured to operate in accordance with the method of FIG. 7. The method can be performed by or under the control of the processing circuitry 22 of the NF consumer node 20*a* described earlier with reference to FIG. 6.

As illustrated at block 202 of FIG. 7, the second response to the first service request is received from the first SCP node 10. The first service request is the request for the first service, requested by the first NF node 20a, to be provided (e.g. executed or run).

The second response comprises the information indicative of which group of the one or more groups comprises the second NF node that is selected to provide (e.g. execute or run) the first service.

FIG. 8 is a flowchart illustrating a method performed by an NF consumer node 20a, 20b, which can be the first NF node 20a of the first service consumer or the third NF node 20b of the second service consumer, in accordance with an embodiment. The method is for handling the second service request in the network. The NF consumer node 20a, 20b described earlier with reference to FIG. 6 can be configured to operate in accordance with the method of FIG. 8. The method can be performed by or under the control of the processing circuitry 22 of the NF consumer node 20a, 20b described earlier with reference to FIG. 6.

The method is performed in response to acquiring the information indicative of which group of the one or more groups comprises the second NF node that is selected to provide (e.g. execute or run) the first service requested by the first NF node 20a of the first service consumer. In some embodiments, the information may be acquired from the second response to the first service request (which precedes the second service request). In some other embodiments, the information may be acquired by the third NF node 20b from the first NF node 20a.

As illustrated at block 204 of FIG. 8, transmission of the second service request is initiated towards the first SCP node 10. The second service request is a request for a second service, requested by the NF consumer node 20a, 20b (i.e. the first NF node 20a or the third NF node 20b), to be provided (e.g. executed or run). The second service request comprises the information indicative of which group of the one or more groups comprises the second NF node. Herein, the term "initiate" can mean, for example, cause or establish. Thus, the processing circuitry 22 of the NF consumer node 20a, 20b can be configured to itself transmit the second service request (e.g. via a communications interface 26 of the NF consumer node 20a, 20b) or can be configured to cause another node to transmit the second service request.

There is also provided a method performed by a system. The method comprises any one or more of the methods described herein in respect of the first SCP node 10 and any one or more of the methods described herein in respect of the NF consumer node 20a, 20b. There is also provided a system comprising at least one first SCP node 10 as described herein and at least one NF consumer node 20a, 20b as described herein.

Figure 9:
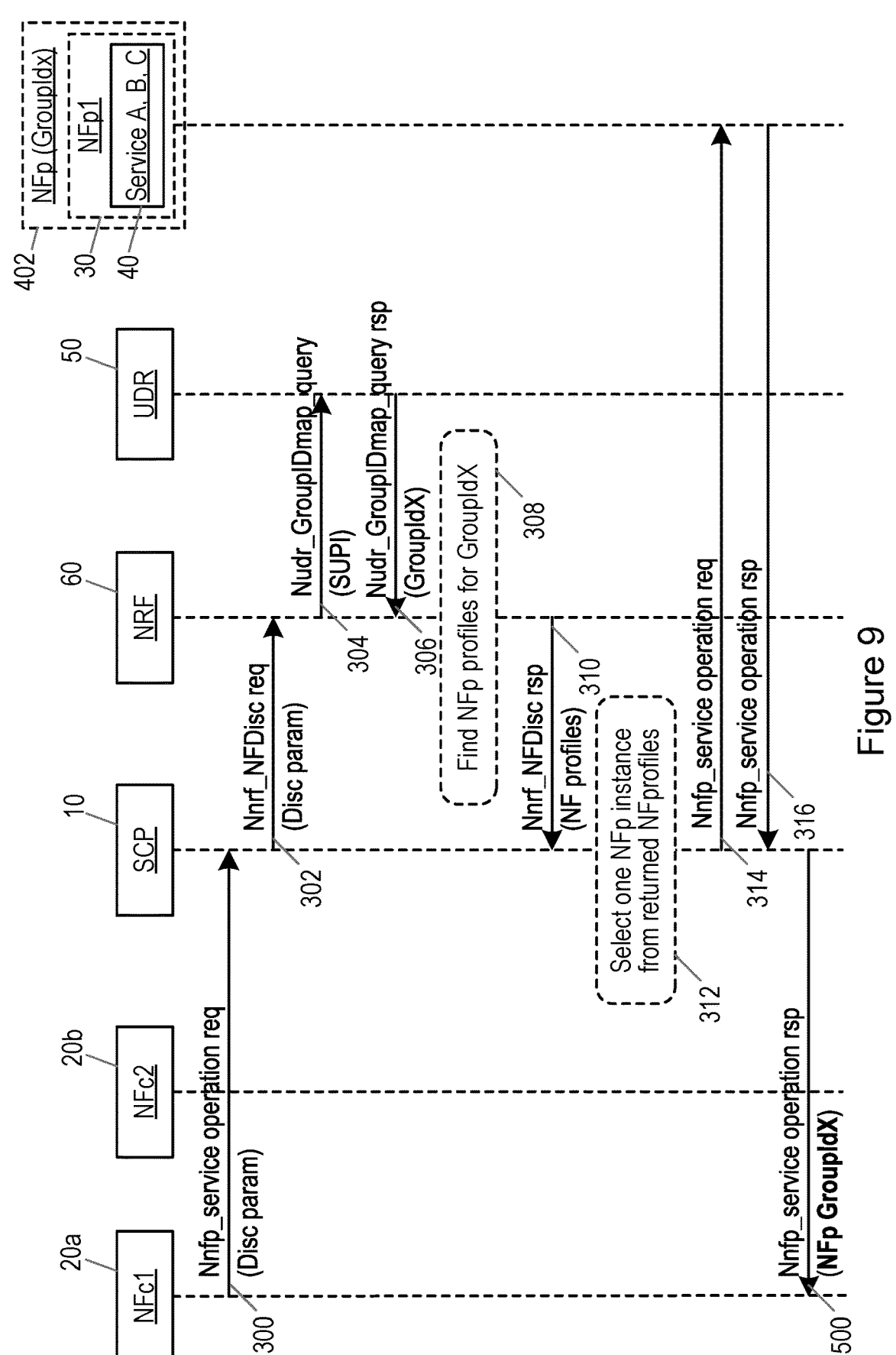
FIG. 9 is a signalling diagram illustrating an exchange of
signals in a system according to an embodiment.

FIG. 9 is a signalling diagram illustrating an exchange of signals in a system according to an embodiment. The system illustrated in FIG. 9 comprises a first SCP node 10 ("SCP"), a first NF node 20a of a first service consumer ("NFc1"), a second NF node 30 of a service producer ("NFp1"), and a third NF node 20b of a second service consumer ("NFc2"). In some embodiments, the first service consumer may be the same service consumer as the second service consumer. Alternatively, in other embodiments, the first service consumer may be a different service consumer to the second service consumer.

A group (or set) 402 of NF nodes of one or more service producers ("NFp (GroupIdx)") comprises the second NF node 30. Although only one second NF node 30 is illustrated in FIG. 9, it will be understood that the group 402 of NF nodes may comprise a single second NF node 30 or a plurality of NF nodes of one or more service producers including the second NF node 30. The first SCP node 10 is configured to operate as an SCP between the first NF node 20a and the second NF node 30 and/or between the third NF node 20b and the second NF node 30. The second NF node 30 can be configured to provide (e.g. execute or run) one or more services 40 ("Service A, B, C"). The first SCP node 10 can be as described earlier with reference to any one or more of FIGS. 3, 4 and 5. The first NF node 20a and/or the third NF node 20b can be as described earlier with reference to any one or more of FIGS. 6, 7 and 8.

The system illustrated in FIG. 9 may optionally also comprise a unified data repository (UDR) node 50 and/or a network repository function (NRF) node 60. Generally, a UDR node 50 is a node that stores subscription data, which is data related to one or more subscribers of the network. Generally, an NRF node 60 is a node that provides NF service registration and discovery. An NRF node 60 thus enables NF nodes to identify services offered by other NF nodes. In some embodiments, an entity may comprise the first SCP node 10 and the NRF node 60. That is, in some embodiments, the first SCP node 10 can be merged with the NRF node 60 in a combined entity. Although only one SCP node 10 and only one group 402 of NF nodes of one or more service producers is illustrated in FIG. 9, the system can comprise one or more SCP nodes and/or one or more groups (or sets) of NF nodes of one or more service producers. In some embodiments, the NF nodes of one or more service producers may be grouped according to the type of NF node.

In some embodiments, the first SCP node 10 and the first NF node 20a may be deployed in independent deployment units, the first SCP node 10 and the third NF node 20b may be deployed in independent deployment units, and/or the first SCP node 10 and the second NF node 30 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20a, part (e.g. a service agent) of the first SCP node 10 may be deployed in the same deployment unit as the third NF node 20b, and/or part (e.g. a service agent) of the first SCP node 10 may be deployed in the same deployment unit as the second NF node 30. Thus, an SCP node based on a service mesh is possible, as described in 3GPP TS 23.501 V16.4.0.

In some embodiments, at least one second SCP node may be configured to operate as an SCP between the first NF node 20a and the first SCP node 10, at least one third SCP node may be configured to operate as an SCP between the first SCP node 10 and the second NF node 30, and/or at least one fourth SCP node may be configured to operate as an SCP between the third NF node 20b and the first SCP node 10. Thus, a multipath of SCP nodes is possible. In some of these embodiments, the first SCP node 10 and one or more of the at least one second SCP node, the at least one third SCP node, and the at least one fourth SCP node may be deployed in independent deployment units. In some embodiments, the at least one second SCP node, the at least one third SCP node, and/or the at least one fourth SCP node may be deployed as distributed network elements.

As illustrated by arrow 300 of FIG. 9, the first NF node 20a initiates transmission of (e.g. itself transmits or causes another node to transmit, such as via its communications interface 26) a first service request towards the first SCP node 10. The first SCP node 10 receives the first service request 300. The first service request 300 is a request for a first service 40, requested by the first NF node 20*a*, to be provided (e.g. executed or run). The first service 40 may, for example be requested by the first NF node 20*a* for a subscriber (e.g. user or user equipment, UE). In some embodiments, the service request 300 may comprise discovery and/or selection parameters. In the example illustrated in FIG. 9, the first NF node 20*a* may provide the first SCP node 10 with all the functional parameters that are required to find suitable NF nodes of one or more servicer producers to provide (e.g. execute or run) the first service 40. At the time of initiating transmission of the first service request, the first NF node 20*a* is not aware of which group 402 of NF nodes of one or more service producers comprises the second NF node 30 that can provide (e.g. execute or run) the first service 40. For example, the first NF node 20*a* is not aware of which group 402 of NF nodes of one or more service producers that the subscriber for which the first service 40 is requested belongs. As such, this information is not provided to the first SCP node 10 as a discovery parameter.

As illustrated by arrow 302 of FIG. 9, the first SCP node 10 initiates transmission of (e.g. itself transmits or causes another node to transmit, such as via its communications interface 16) a discovery request towards the NRF node 60 and thus the NRF node 60 receives this discovery request 302. The discovery request 302 is a request for information indicative of one or more NF nodes of one or more service producers for providing the first service 40 requested by the first NF node 20. The discovery request 302 can comprise discovery and/or selection parameter(s). The first SCP node 10 can discover profiles of possible destination NF nodes of one or more service producers based on the discovery parameter(s) received.

In some embodiments, the discovery parameter(s) can include an identifier that (e.g. uniquely) identifies the subscriber, i.e. a subscriber identity, such as a subscription permanent identifiers (SUPI), generic public subscription identifiers (GPSIs), internet protocol multimedia private identity (IMPI), internet protocol public identity (IMPUxx), and/or any other subscriber identifier. An example of a subscriber identifier in the art is, as follows:

node 50 may initiate transmission of (e.g. itself transmit or cause another node to transmit, such as via its communications interface) a response towards the NRF node 60 and thus this response 306 is received by the NRF node 60. This response 306 comprises the information, e.g. "GroupIdX".

Thus, in some embodiments, for an input subscriber identity, the UDR node 50 can return the corresponding information. In other embodiments, the first SCP node 10 may instead directly invoke the operation with the UDR node 50.

As illustrated by block 308 of FIG. 9, the NRF node 60 may find a profile of one or more NF nodes of one or more service producers based on the information. That is, based on the information, the NRF node 60 is able to identify the corresponding profile(s). As illustrated by arrow 310 of FIG. 9, the NRF node 60 may initiate transmission of (e.g. itself transmit or cause another node to transmit, such as via its communications interface) a response to the discovery request 302 towards the first SCP node 10 and thus the first SCP node 10 receives the discovery response 310.

The discovery response 310 comprises the corresponding profile(s). Thus, the NRF node 60 can provide the corresponding profile(s), e.g. for the subscriber identifier, to the first SCP node 10. As illustrated by block 312 of FIG. 9, the first SCP node 10 may select the second NF node 30 (or an instance of the second NF node 30) from the corresponding profile(s). That is, the first SCP node 10 can select one second NF node 30 among the ones provided. A person skilled in the art will be aware of various criteria on the basis of which the selection can be performed.

As illustrated by arrow 314 of FIG. 9, the first SCP node 10 may initiate transmission of (e.g. itself transmit or cause another node to transmit, such as via its communications interface 16) the first service request towards (or forwards the first service request from the first NF node 20*a* to) the selected second NF node 30 and thus the second NF node 30 receives this first service request 314. As illustrated by arrow 316 of FIG. 9, the second NF node 30 may initiate transmission of (e.g. itself transmit or cause another node to transmit, such as via its communications interface) a first response to the first service request 314 towards the first SCP

---

| | |
|---|---|
| subscriber-id | Represents the Subscription Identifier SUPI or GPSI or IMPI or IMPU (see 3GPP TS 23.501 clause 5.9.2 and clause 5.9.8) pattern: ^(imsi-[0-9]{5,15}\|nai-.+\|msisdn-[0-9]{5,15}\|extid-[^@]+@[^@]+\|impi-.+\|impu-.+\|.+)$ |

---

The profiles of the NF nodes of one or more service producers may not include a subscriber identifier range. In these cases, the NRF node 60 may find information indicative of which group 402 of NF nodes of one or more service producers comprise one or more NF nodes for providing the first service. For example, the NRF node 60 may find information indicative of which group 402 of NF nodes of one or more service producers corresponds to the received subscriber identifier. For this, the NRF node 60 may make use of the UDR node 50. Thus, as illustrated by arrow 304 of FIG. 9, the NRF node 60 may initiate transmission of (e.g. itself transmit or cause another node to transmit, such as via its communications interface) a request towards the UDR node 50 for the information and thus the UDR node 50 receives this request 304. For example, for this request 304, the NRF node 60 can make use of the UDR service GroupIdmap_query that provides the information for a subscriber identity. As illustrated by arrow 306 of FIG. 9, the UDR node 10. Thus, the first SCP node 10 receives this first response 316 from the second NF node 30 that is selected to provide (e.g. execute or run) the first service 40. The first response 316 can be received directly from the second NF node 30 (as illustrated in FIG. 9) or indirectly from the second NF node 30, such as via one or more other SCP nodes. Herein, the second NF node 30 that is selected may also be referred to as the second NF node 30 that the first SCP node 10 is required to select.

As illustrated by arrow 500 of FIG. 9, in response to receiving the first response 316 to the first service request 300, the first SCP node 10 initiates transmission of (e.g. itself transmit or cause another node to transmit, such as via its communications interface 16) the first response towards the first NF node 20*a*. Thus, the first NF node 20*a* receives the first response 500 from the first SCP node 10. Advantageously, the first response 500 that is received by the first NF node 20*a* comprises information indicative of which group 402 (of one or more groups) comprises the second NF node 30 that is selected to provide (e.g. execute or run) the first service 40.

In some embodiments, the information can comprise an identifier that (e.g. uniquely) identifies the group 402 (i.e. "GroupIdX"), a routing indicator that points to the group 402, and/or any other information that is indicative of which group 402 comprises the selected second NF node 30. In some embodiments, the information can be associated with the subscriber for which the first service 40 is requested. For example, the group 402 may be a group to which the subscriber belongs or is associated. In some embodiments, the information may be specific to the type of NF node that the group 402 comprises and/or each group of the one or more groups may comprise a different type of NF node. In some embodiments, in each group of the one or more groups (e.g. in the group 402 comprising the second NF node 30), the NF nodes may all be of the same type. Examples of the type of NF node include, but are not limited to, a unified data repository (UDR) node, a unified data management (UDM) node, a home subscriber server (HSS), an authentication server function (AUSF) node, and a policy control function (PCF) node. For example, UDM nodes 1, 2 and 3 may be identified with UDMGroupId1, while UDM nodes 4 and 5 may be identified with GroupId2, etc.

In some embodiments, the information indicative of which group 402 comprises the second NF node 30 can be acquired from the profile of the second NF node 30 (e.g. received at the step illustrated by arrow 310 of FIG. 9). For example, the information may be provisioned in this profile. This profile can be acquired by the first SCP node 10 from the NRF node 60, e.g. by way of the discovery response 310 mentioned earlier. Thus, the discovery response 310 can be seen as the first SCP node 10 acquiring the information according to these embodiments. In some embodiments, the information may be associated with a subscriber for which the first service 40 is requested. In some embodiments, the profile can comprise a mapping between an identifier that (e.g. uniquely) identifies the subscriber and the information. The profile may also comprise a mapping between the information and one or more other (e.g. a range of) identifiers that each (e.g. uniquely) identify another subscriber. Thus, in some embodiments, the information indicative of which group 402 comprises the second NF node 30 can be acquired from the NRF node 60.

Alternatively or in addition, in some embodiments, the information indicative of which group 402 comprises the second NF node 30 can be acquired from the UDR node 50 (e.g. either directly or indirectly via the NRF node 60, such as at the step illustrated by arrow 306). For example, the information may be stored at the UDR node 50. In some embodiments, the UDR node 50 may store a mapping between an identifier that (e.g. uniquely) identifies the subscriber and the information. The UDR node 50 may also store a mapping between the information and one or more other (e.g. a range of) identifiers that each (e.g. uniquely) identify another subscriber.

Thus, as illustrated by arrow 500 of FIG. 9, the first NF node 20*a* acquires information indicative of which group 402 (of one or more groups) comprises the second NF node 30 that is selected to provide (e.g. execute or run) the first service 40 requested by the first NF node 20*a*. As illustrated by block 502 of FIG. 9, in some embodiments, the first NF node 20*a* can store (e.g. in its memory 24 or another memory) the information indicative of which group 402 comprises the second NF node 30. In some embodiments, the information can be stored with other information, such as information that relates to the subscriber for which the first service 40 is requested. For example, the other information may comprise an identifier that (e.g. uniquely) identifies the subscriber, such as any of those mentioned earlier and/or any other subscriber identifier. Thus, in some embodiments, the information may be stored in the subscriber (e.g. user or UE) context.

As illustrated by block 504 of FIG. 9, in some embodiments, the third NF node 20*b* may acquire the information indicative of which group 402 (of the one or more groups) comprises the second NF node 30 that is selected to provide (e.g. execute or run) the first service 40 requested by the first NF node 20*a*. More specifically, the third NF node 20*b* can acquire this information from the first NF node 20*a*. In some embodiments, the information may be provided as part of application data included in a signalling message. Thus, in some embodiments, there may be an interaction between the first NF node 20*a* and the third NF node 20*b*, e.g. for the same subscriber. In some embodiments, the third NF node 20*b* may store the information (e.g. in its memory 24 or another memory). In some embodiments, the information can be stored with other information, such as information that relates to the subscriber for which the first service 40 was requested. For example, the other information may comprise an identifier that (e.g. uniquely) identifies the subscriber, such any of those mentioned earlier and/or any other subscriber identifier. Thus, in some embodiments, the information may be stored in the subscriber (e.g. user or UE) context.

As illustrated by arrow 506 of FIG. 9, in response to acquiring the information indicative of which group 402 comprises the second NF node 30 (at the step illustrated by block 504 of FIG. 9), the third NF node 20*b* initiates transmission of (e.g. itself transmits or causes another node to transmit, such as via its communications interface 26) a second service request towards the first SCP node 10. The second service request 506 is a request for a second service, requested by the third NF node 20*b*, to be provided (e.g. executed or run). The second service may be the same service as the first service 40 or the second service may be a different service to the first service 40. The second service request 506 comprises the information indicative of which group 402 comprises the second NF node 30. In some embodiments, a subscriber for which the second service is requested may be the same subscriber for which the first service 40 is requested.

As illustrated by block 508 of FIG. 9, in some embodiments, the first SCP node 10 can perform discovery (if applicable) and/or selection. For example, the first SCP node 10 may select a fourth NF node of the service producer to provide the second service to the third NF node 20*b* (i.e. that can serve the second service request 506). This selection can be based on the information indicative of which group 402 comprises the second NF node 30. In some embodiments, selecting the fourth NF node based on the information may comprise selecting an NF node of the group 402 as the fourth NF node. In some embodiments, the fourth NF node may be the second NF node 30 of the group 402. In other embodiments, the fourth NF node may be a different NF node of the group 402. In some of these embodiments, the different NF node of the group 402 may be the same type of NF node as the second NF node of the group 402.

The fourth NF node can be selected from one or more fourth NF nodes of a service producer identified for providing the second service. In some embodiments, the one or more fourth NF nodes can be identified in a discovery response, which is a response to a discovery request. For example, although not illustrated in FIG. 9, the first SCP node 10 may initiate transmission of (e.g. itself transmit or cause another node to transmit, such as via its communications interface 16) the discovery request towards the NRF node 60 and thus the NRF node 60 may receive this discovery request. This discovery request can be a request for information indicative of one or more fourth NF nodes for providing the second service. The NRF node 60 may then initiate transmission of (e.g. itself transmit or cause another node to transmit, such as via its communications interface) the discovery response towards the first SCP node 10 and thus the first SCP node 10 may receive this discovery response.

Alternatively or in addition, the one or more fourth NF nodes can be identified in a memory (such as a memory 14 of the first SCP node 10 or any other memory) that stores information indicative of one or more fourth NF nodes for providing the second service. For example, the one or more fourth NF nodes may be stored locally in a memory 14 of the first SCP node 10 from a previous discovery response. For the purpose of the system illustrated in FIG. 9, it will be assumed that the fourth NF node that is selected is the second NF node 30 of the group 402. In this way, the discovery and/or selection procedure can be optimised.

As illustrated by arrow 510 of FIG. 9, the first SCP node 10 may initiate transmission of (e.g. itself transmit or cause another node to transmit, such as via its communications interface 16) the second service request towards (or forwards the second service request from the third NF node 20b to) the selected second NF node 30 and thus the second NF node 30 receives this second service request 510. As illustrated by arrow 512 of FIG. 9, the second NF node 30 may initiate transmission of (e.g. itself transmit or cause another node to transmit, such as via its communications interface) a second response to the second service request 510 towards the first SCP node 10. Thus, the first SCP node 10 receives this second response 512 from the second NF node 30 that is selected to provide (e.g. execute or run) the second service. The second response 512 can be received directly from the second NF node 30 (as illustrated in FIG. 9) or indirectly from the second NF node 30, such as via one or more other SCP nodes.

As illustrated by arrow 514 of FIG. 9, in response to receiving the second response 512 to the second service request 506, the first SCP node 10 initiates transmission of (e.g. itself transmit or cause another node to transmit, such as via its communications interface 16) or forwards the second response towards the third NF node 20b. Thus, the third NF node 20b receives the second response 514 from the first SCP node 10.

As illustrated by arrow 516 of FIG. 9, in response to acquiring the information indicative of which group 402 comprises the second NF node 30 (e.g. at the step illustrated by arrow 500 of FIG. 9 or from the memory in which the information is stored at the step illustrated by block 502 of FIG. 9), the first NF node 20a initiates transmission of (e.g. itself transmits or causes another node to transmit, such as via its communications interface 26) a third service request towards the first SCP node 10. The third service request 516 is a request for a third service, requested by the first NF node 20a, to be provided (e.g. executed or run). The third service may be the same service as the first service 40 or the third service may be a different service to the first service 40. Similarly, the third service may be the same service as the second service or the third service may be a different service to the second service. The third service request 516 comprises the information indicative of which group 402 comprises the second NF node 30. In some embodiments, a subscriber for which the third service is requested may be the same subscriber for which the first service 40 is requested. Similarly, in some embodiments, a subscriber for which the third service is requested may be the same subscriber for which the second service is requested.

As illustrated by block 518 of FIG. 9, in some embodiments, the first SCP node 10 can perform discovery (if applicable) and/or selection. For example, the first SCP node 10 may select a fifth NF node of the service producer to provide the third service to the first NF node 20a (i.e. that can serve the third service request 516). This selection can be based on the information indicative of which group 402 comprises the second NF node 30. In some embodiments, selecting the fifth NF node based on the information may comprise selecting an NF node of the group 402 as the fifth NF node. In some embodiments, the fifth NF node may be the second NF node 30 of the group 402. In other embodiments, the fifth NF node may be a different NF node of the group 402, such as the fourth NF node or any other NF node of the group 402. In some of these embodiments, the different NF node of the group 402 may be the same type of NF node as the second NF node 30 of the group 402.

The fifth NF node can be selected from one or more fifth NF nodes of a service producer identified for providing the third service. In some embodiments, the one or more fifth NF nodes can be identified in a discovery response, which is a response to a discovery request. For example, although not illustrated in FIG. 9, the first SCP node 10 may initiate transmission of (e.g. itself transmit or cause another node to transmit, such as via its communications interface 16) the discovery request towards the NRF node 60 and thus the NRF node 60 may receive this discovery request. This discovery request can be a request for information indicative of one or more fifth NF nodes for providing the third service. The NRF node 60 may then initiate transmission of (e.g. itself transmit or cause another node to transmit, such as via its communications interface) the discovery response towards the first SCP node 10 and thus the first SCP node 10 may receive this discovery response.

Alternatively or in addition, the one or more fifth NF nodes can be identified in a memory (such as a memory 14 of the first SCP node 10 or any other memory) that stores information indicative of one or more fifth NF nodes for providing the third service. For example, the one or more fifth NF nodes may be stored locally in a memory 14 of the first SCP node 10 from a previous discovery response. For the purpose of the system illustrated in FIG. 9, it will be assumed that the fifth NF node that is selected is the second NF node 30 of the group 402. In this way, the discovery and/or selection procedure can be optimised.

As illustrated by arrow 520 of FIG. 9, the first SCP node 10 may initiate transmission of (e.g. itself transmit or cause another node to transmit, such as via its communications interface 16) the third service request towards (or forwards the third service request from the first NF node 20a to) the selected second NF node 30 and thus the second NF node 30 receives this second service request 520. As illustrated by arrow 522 of FIG. 9, the second NF node 30 may initiate transmission of (e.g. itself transmit or cause another node to transmit, such as via its communications interface) a third response to the third service request 520 towards the first SCP node 10. Thus, the first SCP node 10 receives this third response 522 from the second NF node 30 that is selected to provide (e.g. execute or run) the third service. The third response 522 can be received directly from the second NF node 30 (as illustrated in FIG. 9) or indirectly from the second NF node 30, such as via one or more other SCP nodes.

As illustrated by arrow 524 of FIG. 9, in response to receiving the third response 522 to the third service request 516, the first SCP node 10 initiates transmission of (e.g. itself transmit or cause another node to transmit, such as via its communications interface 16) or forwards the third response towards the first NF node 20a. Thus, the first NF node 20a receives the third response 524 from the first SCP node 10.

Although the disclosure focuses on information that is indicative of which group 402 comprises the selected second NF node 30, it will be understood that it is also applicable to any other information (e.g. parameter) that the first SCP node 10 may acquire (e.g. in the same manner as described herein in respect of the information that is indicative of which group 402 comprises the selected second NF node 30), which may be required by the first NF node 20a and/or the third NF node 20b, or which may be required to be sent from the first NF node 20a to the third NF node 20b or any other NF node of a service consumer.

There is also provided a computer program comprising instructions which, when executed by processing circuitry (such as the processing circuitry 12 of the first SCP node 10 described earlier and/or the processing circuitry 22 of the NF consumer node 20a, 20b described earlier), cause the processing circuitry to perform at least part of the method described herein. There is provided a computer program product, embodied on a non-transitory machine-readable medium, comprising instructions which are executable by processing circuitry (such as the processing circuitry 12 of the first SCP node 10 described earlier and/or the processing circuitry 22 of the NF consumer node 20a, 20b described earlier) to cause the processing circuitry to perform at least part of the method described herein. There is provided a computer program product comprising a carrier containing instructions for causing processing circuitry (such as the processing circuitry 12 of the first SCP node 10 described earlier and/or the processing circuitry 22 of the NF consumer node 20a, 20b described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

Other embodiments include those defined in the following numbered statements:

Embodiment 1. A method for handling a first response to a first service request in a network, wherein the method is performed by a first service communication proxy, SCP, node (10) that is configured to operate as an SCP between a first network function, NF, node (20a) of a service consumer and one or more groups of second NF nodes of one or more service producers, the method comprising:

in response to receiving the first response (316) to the first service request (300), wherein the first service request (300) is a request for a first service (40), requested by the first NF node (20a), to be provided:

initiating transmission of a second response (500) to the first service request (300) towards the first NF node (20a), wherein the first response (316) is received from a second NF node (30) that is selected to provide the first service (40) and the second response (500) comprises information indicative of which group (402) of the one or more groups comprises the second NF node (30).

Embodiment 2. A method according to Embodiment 1, wherein:

the information comprises:

an identifier that identifies the group (402); and/or a routing indicator that points to the group (402).

Embodiment 3. A method according to Embodiment 1 or 2, the method comprising:

acquiring (310) the information.

Embodiment 4. A method according to any of the preceding Embodiments, wherein:

the information is acquired from:

a profile of the second NF node (30); and/or a unified data repository, UDR, node (50).

Embodiment 5. A method according to Embodiment 4, wherein:

the profile is acquired from a network repository function, NRF, node (60).

Embodiment 6. A method according to any of the preceding Embodiments, wherein:

the information is associated with a subscriber for which the first service (40) is requested.

Embodiment 7. A method according to Embodiment 6, when dependent on Embodiment 4 or 5, wherein:

the profile comprises a mapping between an identifier that identifies the subscriber and the information.

Embodiment 8. A method according to any of the preceding Embodiments, wherein:

the first response (316) is received directly from the second NF node (30) or indirectly from the second NF node (30).

Embodiment 9. A method according to any of the preceding Embodiments, wherein:

the first SCP node (10) and the first NF node (20) are deployed in independent deployment units; and/or the first SCP node (10) and the second NF node (30) are deployed in independent deployment units.

Embodiment 10. A method according to any of Embodiments 1 to 8, wherein:

the first SCP node (10) is deployed as a distributed network element.

Embodiment 11. A method according to Embodiment 10, wherein:

part of the first SCP node (10) is deployed in the same deployment unit as the first NF node (20); and/or part of the first SCP node (10) is deployed in the same deployment unit as the second NF node (30).

Embodiment 12. A method according to any of the preceding Embodiments, wherein:

at least one second SCP node is configured to operate as an SCP between the first NF node (20) and the first SCP node (10); and/or at least one third SCP node is configured to operate as an SCP between the first SCP node (10) and the second NF node (30).

Embodiment 13. A method according to Embodiment 12, wherein:

the first SCP node (10) and one or more of the at least one second SCP node and the at least one third SCP node are deployed in independent deployment units.

Embodiment 14. A method according to Embodiment 12, wherein:

the at least one second SCP node and/or the at least one third SCP node are deployed as distributed network elements.

Embodiment 15. A method according to any of the preceding Embodiments, wherein:

an entity comprises the first SCP node (10) and a network repository function, NRF, node (60).

Embodiment 16. A first service communication proxy, SCP, node (10) comprising:

processing circuitry (12) configured to operate in accordance with any of Embodiments 1 to 15.

Embodiment 17. A first SCP node (10) according to Embodiment 16, wherein:

the first SCP node (10) comprises:

at least one memory (14) for storing instructions which, when executed by the processing circuitry (12), cause the first SCP node (10) to operate in accordance with any of Embodiments 1 to 15.

Embodiment 18. A method for handling a first response to a first service request in a network, wherein the method is performed by a first network function, NF, node (20a) of a service consumer and a first service communication proxy, SCP, node (10) is configured to operate as an SCP between the first NF node (20a) and one or more groups of second NF nodes of one or more service producers, the method comprising: receiving, from the first SCP node (10), the first response (500) to the first service request (300), wherein the first service request (300) is a request for a first service (40), requested by the first NF node (20a), to be provided and the first response (500) comprises information indicative of which group (402) of the one or more groups comprises a second NF node (30) that is selected to provide the first service (40).

Embodiment 19. A method according to Embodiment 18, wherein:

the information comprises:

an identifier that identifies the group (402); and/or a routing indicator that points to the group (402).

Embodiment 20. A method according to Embodiment 18 or 19, wherein:

the information is from:

a profile of the second NF node (30); and/or a unified data repository, UDR, node (50).

Embodiment 21. A method according to Embodiment 20, wherein:

the profile is from a network repository function, NRF, node (60).

Embodiment 22. A method according to any of Embodiments 18 to 21, wherein:

the information is associated with a subscriber for which the first service (40) is requested.

Embodiment 23. A method according to Embodiment 22, when dependent on Embodiment 20 or 21, wherein:

the profile comprises a mapping between an identifier that identifies the subscriber and the information.

Embodiment 24. A method according to any of Embodiments 18 to 23, the method comprising:

storing the information in a memory (24).

Embodiment 25. A method according to Embodiment 24, wherein:

the information is stored with other information, wherein the other information is information that relates to a subscriber for which the first service (40) is requested.

Embodiment 26. A method according to Embodiment 25, wherein:

the other information comprises an identifier that identifies the subscriber.

Embodiment 27. A method according to any of Embodiments 18 to 26, wherein:

the first SCP node (10) and the first NF node (20) are deployed in independent deployment units; and/or the first SCP node (10) and the second NF node (30) are deployed in independent deployment units.

Embodiment 28. A method according to any of Embodiments 18 to 26, wherein:

the first SCP node (10) is deployed as a distributed network element.

Embodiment 29. A method according to Embodiment 28, wherein:

part of the first SCP node (10) is deployed in the same deployment unit as the first NF node (20); and/or part of the first SCP node (10) is deployed in the same deployment unit as the second NF node (30).

Embodiment 30. A method according to any of Embodiments 18 to 29, wherein:

at least one second SCP node is configured to operate as an SCP between the first NF node (20) and the first SCP node (10); and/or at least one third SCP node is configured to operate as an SCP between the first SCP node (10) and the second NF node (30).

Embodiment 31. A method according to Embodiment 30, wherein:

the first SCP node (10) and one or more of the at least one second SCP node and the at least one third SCP node are deployed in independent deployment units.

Embodiment 32. A method according to Embodiment 30, wherein:

the at least one second SCP node and/or the at least one third SCP node are deployed as distributed network elements.

Embodiment 33. A method according to any of Embodiments 18 to 32, wherein:

an entity comprises the first SCP node (10) and a network repository function, NRF, node (60).

Embodiment 34. A first network function, NF, node (20a) of a service consumer, the first NF node (20a) comprising:

processing circuitry (22) configured to operate in accordance with any of Embodiments 18 to 33.

Embodiment 35. A first NF node (20a) according to Embodiment 34, wherein:

the first NF node (20a) comprises:

at least one memory (24) for storing instructions which, when executed by the processing circuitry (22), cause the first NF node (20a) to operate in accordance with any of Embodiments 18 to 33.

Embodiment 36. A method for handling a first service request in a network, wherein the method is performed by a first network function, NF, node (20a, 20b) of a first service consumer and a first service communication proxy, SCP, node (10) is configured to operate as an SCP between the first NF node (20a, 20b) and one or more groups of second NF nodes of one or more service producers, the method comprising:

in response to acquiring (500, 504) information indicative of which group (402) of the one or more groups comprises a second NF node (30) that is selected to provide a first service (40) requested by a third NF node (20a) of a second service consumer:

initiating transmission of the first service request (506, 516) towards the first SCP node (10), wherein the first service request (506, 516) is a request for a second service, requested by the first NF node (20a, 20b), to be provided and the first service request (506, 516) comprises the information indicative of which group (402) of the one or more groups comprises the second NF node (30).

Embodiment 37. A method according to Embodiment 36, wherein:

the information comprises:

an identifier that identifies the group (402); and/or a routing indicator that points to the group (402).

Embodiment 38. A method according to Embodiment 36 or 37, wherein:

the information is from:

a profile of the second NF node (30); and/or a unified data repository, UDR, node (50).

Embodiment 39. A method according to Embodiment 38, wherein:

the profile is from a network repository function, NRF, node (60).

Embodiment 40. A method according to any of Embodiments 36 to 39, wherein:

the information is associated with a subscriber for which the first service (40) is requested.

Embodiment 41. A method according to Embodiment 40, when dependent on Embodiment 38 or 39, wherein:

the profile comprises a mapping between an identifier that identifies the subscriber and the information.

Embodiment 42. A method according to Embodiment 40 or 41, wherein:

a subscriber for which the second service is requested is the same subscriber for which the first service (40) is requested.

Embodiment 43. A method according to any of Embodiments 36 to 42, wherein:

the first NF node (20a) is the same NF node as the third NF node (20a); or the first NF node (20b) is a different NF node to the third NF node (20a).

Embodiment 44. A method according to Embodiment 43, wherein:

the first NF node (20a) is the same NF node as the third NF node (20a) and the information is acquired from a response (500) to a second service request (300) that precedes the first service request (506, 516), wherein the second service request (300) is a request for the first service (40), requested by the third NF node (20a), to be provided; or the first NF node (20b) is a different NF node to the third NF node (20a) and the information is acquired (504) from the third NF node (20a).

Embodiment 45. A method according to any of Embodiments 36 to 44, wherein:

the second service is the same service as the first service (40); or the second service is a different service to the first service (40).

Embodiment 46. A method according to any of Embodiments 36 to 45, wherein:

the first service consumer is the same service consumer as the second service consumer; or the first service consumer is a different service consumer to the second service consumer.

Embodiment 47. A method according to any of Embodiments 36 to 46, wherein:

the first SCP node (10) and the first NF node (20a, 20b) are deployed in independent deployment units; and/or the first SCP node (10) and the second NF node (30) are deployed in independent deployment units.

Embodiment 48. A method according to any of Embodiments 36 to 46, wherein:

the first SCP node (10) is deployed as a distributed network element.

Embodiment 49. A method according to Embodiment 48, wherein:

part of the first SCP node (10) is deployed in the same deployment unit as the first NF node (20a, 20b); and/or part of the first SCP node (10) is deployed in the same deployment unit as the second NF node (30).

Embodiment 50. A method according to any of Embodiments 36 to 49, wherein:

at least one second SCP node is configured to operate as an SCP between the first NF node (20a, 20b) and the first SCP node (10); and/or at least one third SCP node is configured to operate as an SCP between the first SCP node (10) and the second NF node (30).

Embodiment 51. A method according to Embodiment 50, wherein:

the first SCP node (10) and one or more of the at least one second SCP node and the at least one third SCP node are deployed in independent deployment units.

Embodiment 52. A method according to Embodiment 50, wherein:

the at least one second SCP node and/or the at least one third SCP node are deployed as distributed network elements.

Embodiment 53. A method according to any of Embodiments 36 to 52, wherein:

an entity comprises the first SCP node (10) and a network repository function, NRF, node (60).

Embodiment 54. A first network function, NF, node (20a, 20b) of a service consumer, the first NF node (20a, 20b) comprising:

processing circuitry (22) configured to operate in accordance with any of Embodiments 36 to 53.

Embodiment 55. A first NF node (20a, 20b) according to Embodiment 54, wherein:

the first NF node (20a, 20b) comprises:

at least one memory (24) for storing instructions which, when executed by the processing circuitry (22), cause the first NF node (20a, 20b) to operate in accordance with any of Embodiments 36 to 53.

Embodiment 56. A method for handling a first service request in a network, wherein the method is performed by a first service communication proxy, SCP, node (10) that is configured to operate as an SCP between a first network function, NF, node (20a, 20b) of a first service consumer and one or more groups of second NF nodes of one or more service producers, the method comprising:

receiving the first service request (506, 516) from the first NF node (20a, 20b), wherein the first service request (506, 516) is a request for a first service, requested by the first NF node (20a, 20b), to be provided and the first service request (506, 516) comprises information indicative of which group (402) of the one or more groups comprises a second NF node (30) that is selected to provide a second service (40) requested by a third NF node (20a) of a second service consumer.

Embodiment 57. A method according to Embodiment 56, wherein:

the information comprises:

an identifier that identifies the group (402); and/or a routing indicator that points to the group (402).

Embodiment 58. A method according to Embodiment 56 or 57, wherein:

the information is from:

a profile of the second NF node (30); and/or a unified data repository, UDR, node (50).

Embodiment 59. A method according to Embodiment 58, wherein:

the profile is from a network repository function, NRF, node (60).

Embodiment 60. A method according to any of Embodiments 56 to 59, wherein:

the information is associated with a subscriber for which the second service (40) is requested.

Embodiment 61. A method according to Embodiment 60, when dependent on Embodiment 58 or 59, wherein:

the profile comprises a mapping between an identifier that identifies the subscriber and the information.

Embodiment 62. A method according to Embodiment 60 or 61, wherein:

a subscriber for which the first service is requested is the same subscriber for which the second service (40) is requested.

Embodiment 63. A method according to any of Embodiments 56 to 62, wherein:

the first NF node (20a) is the same NF node as the third NF node (20a); or the first NF node (20b) is a different NF node to the third NF node (20a).

Embodiment 64. A method according to any of Embodiments 56 to 63, wherein:

the first service is the same service as the second service (40); or the first service is a different service to the second service (40).

Embodiment 65. A method according to any of Embodiments 56 to 64, wherein:

the first service consumer is the same service consumer as the second service consumer; or the first service consumer is a different service consumer to the second service consumer.

Embodiment 66. A method according to any of Embodiments 56 to 65, the method comprising:

selecting (508), based on the information, a fourth NF node of the service producer to provide the first service to the first NF node (20a, 20b).

Embodiment 67. A method according to Embodiment 66, wherein:

selecting (508) the fourth NF node based on the information comprises:

selecting an NF node of the group (402) as the fourth NF node.

Embodiment 68. A method according to Embodiment 67, wherein:

the fourth NF node is the second NF node of the group (402) or a different NF node of the group (402).

Embodiment 69. A method according to Embodiment 68, wherein:

the different NF node of the group (402) is the same type of NF node as the second NF node of the group (402);

the information is specific to the type of NF node that the group (402) comprises; and/or each group of the one or more groups comprises a different type of NF node.

Embodiment 70. A method according to any of Embodiments 66 to 69, wherein:

the fourth NF node is selected from one or more fourth NF nodes of the service producer identified for providing the first service.

Embodiment 71. A method according to Embodiment 70, wherein:

the one or more fourth NF nodes are identified in a discovery response, wherein the discovery response is a response to a discovery request and the discovery request is a request for information indicative of one or more fourth NF nodes for providing the first service; or the one or more fourth NF nodes are identified in a memory (14) that stores information indicative of one or more fourth NF nodes for providing the first service.

Embodiment 72. A method according to any of Embodiments 56 to 71, wherein:

the first SCP node (10) and the first NF node (20a, 20b) are deployed in independent deployment units; and/or the first SCP node (10) and the second NF node (30) are deployed in independent deployment units.

Embodiment 73. A method according to any of Embodiments 56 to 71, wherein:

the first SCP node (10) is deployed as a distributed network element.

Embodiment 74. A method according to Embodiment 73, wherein:

part of the first SCP node (10) is deployed in the same deployment unit as the first NF node (20a, 20b); and/or part of the first SCP node (10) is deployed in the same deployment unit as the second NF node (30).

Embodiment 75. A method according to any of Embodiments 56 to 74, wherein:

at least one second SCP node is configured to operate as an SCP between the first NF node (20a, 20b) and the first SCP node (10); and/or at least one third SCP node is configured to operate as an SCP between the first SCP node (10) and the second NF node (30).

Embodiment 76. A method according to Embodiment 75, wherein:

the first SCP node (10) and one or more of the at least one second SCP node and the at least one third SCP node are deployed in independent deployment units.

Embodiment 77. A method according to Embodiment 75, wherein:

the at least one second SCP node and/or the at least one third SCP node are deployed as distributed network elements.

Embodiment 78. A method according to any of Embodiments 56 to 77, wherein:

an entity comprises the first SCP node (10) and a network repository function, NRF, node (60).

Embodiment 79. A first service communication proxy, SCP, node (10) comprising:

processing circuitry (12) configured to operate in accordance with any of Embodiments 56 to 78.

Embodiment 80. A first SCP node (10) according to Embodiment 79, wherein:

the first SCP node (10) comprises:

at least one memory (14) for storing instructions which, when executed by the processing circuitry (12), cause the first SCP node (10) to operate in accordance with any of Embodiments 56 to 78.

Embodiment 81. A method performed by a system, the method comprising:

the method according to any of Embodiments 1 to 15 and/or any of Embodiments 56 to 78; and the method according to any of Embodiments 18 to 33 and/or any of Embodiments 36 to 53.

Embodiment 82. A system comprising:

at least one first SCP node (10) according to Embodiment 16 or 17 and/or Embodiment 79 or 80; and at least one first NF node (20a, 20b) according to Embodiment 34 or 35 and/or Embodiment 54 or 55.

Embodiment 83. A computer program comprising instructions which, when executed by processing circuitry, cause the processing circuitry to perform the method according to any of Embodiments 1 to 15, any of Embodiments 18 to 33, any of Embodiments 36 to 53, and/or any of Embodiments 56 to 78.

Embodiment 84. A computer program product, embodied on a non-transitory machine-readable medium, comprising instructions which are executable by processing circuitry to cause the processing circuitry to perform the method according to any of Embodiments 1 to 15, any of Embodiments 18 to 33, any of Embodiments 36 to 53, and/or any of Embodiments 56 to 78.

In some embodiments, the first SCP node functionality and/or the NF consumer node functionality described herein can be performed by hardware. Thus, in some embodiments, any one or more of the first SCP node 10 and the NF consumer node 20a, 20b described herein can be a hardware node. However, it will also be understood that optionally at least part or all of the first SCP node functionality and/or the NF consumer node functionality described herein can be virtualized. For example, the functions performed by any one or more of the first SCP node 10 and the NF consumer node 20a, 20b described herein can be implemented in software running on generic hardware that is configured to orchestrate the node functionality. Thus, in some embodiments, any one or more of the first SCP node 10 and the NF consumer node 20a, 20b described herein can be a virtual node. In some embodiments, at least part or all of the first SCP node functionality and/or the NF consumer node functionality described herein may be performed in a network enabled cloud. The first SCP node functionality and/or the NF consumer node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there are advantageously provided improved techniques for handling service requests and responses in a network. In particular, in the manner described herein, the means are provided for the first SCP node 10 to provide the first NF node 20a with information indicative of which group comprises the second NF node 30 (e.g. the Group ID for this second NF node 30). This information may, for example, be associated with a subscriber for which a service managed via the first SCP node 10 is requested by the first NF node 20a. For example, the subscriber may belong to or be associated with a specific group. The information indicative of which group comprises the second NF node 30 can be used to enhance the second NF node 30 discovery and/or selection capabilities currently available in the first SCP node 10 and to optimise such procedures for subsequent service requests, e.g. from the same or a different NF consumer node 20a, 20b and/or related to a given subscriber.

The possibility for the first SCP node 10 to provide the first NF node 20a with the information indicative of which group comprises the second NF node 30 (e.g. information regarding the Group ID to which the subscriber related to a service request managed via the first SCP node 10 belongs) makes it possible for the first NF node 20a to facilitate the second NF node 30 discovery and/or selection in other NF nodes 20b of a service consumer and/or other SCP nodes that also need to interact with the second NF node 30, e.g. for the same subscriber. In particular, this is made possible by the inclusion of the information indicative of which group comprises the second NF node 30 within subsequent service requests. Moreover, the knowledge of the information indicative of which group comprises the second NF node 30 at the first NF node 20a can be also used as criteria for second NF node 30 selection during subsequent service requests, e.g. from the same or a different NF consumer node 20a, 20b via the first SCP node 10, and/or related to a given subscriber.

Thus, the technique describe herein allows the first NF node 20a to handle the information indicative of which group comprises the second NF node 30, which is particularly advantageous when using indirect communication, e.g. with delegated discovery. The existing procedures are enhanced with the inclusion of this information in the interactions between the NF consumer nodes 20a, 20b and the first SCP node 10. In addition to the optimisation that this provides to the second NF node 30 discovery and/or selection procedure, it also provides optimisation in subsequent interactions between the same and/or a different NF consumer node 20a, 20b that need to communicate with the second NF node 30, e.g. for the same subscriber. Moreover, further optimisation is achieved by way of the transfer of the information from one NF consumer node (the first NF node 20a) to another NF consumer node (the third NF node 20b).

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first service communication proxy (SCP) node that is configured to operate as an SCP between a first network function (NF) node of a first service consumer and one or more groups of second NF nodes of one or more service producers, the method comprising:

receiving, from the first NF node, a first service request that is a request by the first NF node for a first service, wherein the first service request includes an identity of the group of second NF nodes to which belongs a second NF node that is selected to provide a second service requested by a third NF node of a second service consumer; and before receiving the first service request:

receiving, from the second NF node selected to provide the second service, a second response to a second service request, wherein the second service request is a request by the third NF node for the second service; and in response to receiving the second response, initiating transmission of a third response to the second service request towards the third NF node, wherein the third response includes the identity of the group of second NF nodes to which belongs the second NF node selected to provide the second service.

2. The method of claim 1, wherein the identity of the group is from:

a profile of the second NF node; and/or a unified data repository (UDR) node.

3. The method of claim 1, wherein the identity of the group is associated with a subscriber for which the second service is requested.

4. The method of claim 1, further comprising selecting, based on the identity of the group, a fourth NF node of the service producer to provide the first service to the first NF node, wherein selecting the fourth NF node based on the identity of the group comprises selecting, as the fourth NF node, an NF node in the identified group which comprises the second NF node, wherein the fourth NF node is the second NF node or a different NF node that is the same type of NF node as the second NF node.

5. The method of claim 4, wherein the fourth NF node is selected from one or more fourth NF nodes of the service producer identified for providing the first service, wherein:

the one or more fourth NF nodes are identified in a discovery response, wherein the discovery response is a response to a discovery request and the discovery request is a request for information indicative of one or more fourth NF nodes for providing the first service; or the one or more fourth NF nodes are identified in a memory that stores information indicative of one or more fourth NF nodes for providing the first service.

6. A first service communication proxy (SCP) node configured to operate as an SCP between a first network function (NF) node of a first service consumer and one or more groups of second NF nodes of one or more service producers, the first SCP node comprising processing circuitry configured to:

receive, from the first NF node, a first service request that is a request by the first NF node for a first service, wherein the first service request includes an identity of the group of second NF nodes to which belongs a second NF node that is selected to provide a second service requested by a third NF node of a second service consumer;

wherein the processing circuitry is further configured to, before receiving the first service request:

receive, from the second NF node selected to provide the second service, a second response to a second service request, wherein the second service request is a request by the third NF node for the second service; and in response to receiving the second response, initiate transmission of a third response to the second service request towards the third NF node, wherein the third response includes the identity of the group of second NF nodes to which belongs the second NF node selected to provide the second service.

7. The first SCP node of claim 6, wherein the identity of the group is from:

a profile of the second NF node; and/or a unified data repository (UDR) node.

8. The first SCP node of claim 6, wherein the identity of the group is associated with a subscriber for which the second service is requested.

9. The first SCP node of claim 6, the processing circuitry further configured to select, based on the identity of the group, a fourth NF node of the service producer to provide the first service to the first NF node, wherein selecting the fourth NF node based on the identity of the group comprises selecting, as the fourth NF node, an NF node in the identified group which comprises the second NF node, wherein the fourth NF node is the second NF node or a different NF node that is the same type of NF node as the second NF node.

10. The first SCP node of claim 9, wherein the fourth NF node is selected from one or more fourth NF nodes of the service producer identified for providing the first service, wherein:

the one or more fourth NF nodes are identified in a discovery response, wherein the discovery response is a response to a discovery request and the discovery request is a request for information indicative of one or more fourth NF nodes for providing the first service; or the one or more fourth NF nodes are identified in a memory that stores information indicative of one or more fourth NF nodes for providing the first service.

11. The method of claim 1, wherein the identity of the group to which the second NF node belongs is a Group ID that directly identifies that group, wherein different groups of second NF nodes are directly identified by different Group IDs.

12. The first SCP node of claim 6, wherein the identity of the group to which the second NF node belongs is a Group ID that directly identifies that group, wherein different groups of second NF nodes are directly identified by different Group IDs.

* * * * *